: US 10,848,676 B2

(12) United States Patent
Murashima et al.

(10) Patent No.: US 10,848,676 B2
(45) Date of Patent: Nov. 24, 2020

(54) SEMICONDUCTOR DEVICE AND ELECTRONIC DEVICE

(71) Applicant: RENESAS ELECTRONICS CORPORATION, Tokyo (JP)

(72) Inventors: Ryuichi Murashima, Tokyo (JP); Hirohide Okuno, Tokyo (JP); Hiroshi Murakami, Tokyo (JP); Hiromi Nishi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 26 days.

(21) Appl. No.: 16/173,710

(22) Filed: Oct. 29, 2018

(65) Prior Publication Data

US 2019/0191090 A1    Jun. 20, 2019

(30) Foreign Application Priority Data

Dec. 14, 2017  (JP) ................. 2017-239339

(51) Int. Cl.
*H04N 5/232*  (2006.01)
*G02B 27/64*  (2006.01)

(52) U.S. Cl.
CPC ....... *H04N 5/23287* (2013.01); *G02B 27/646* (2013.01); *H04N 5/2328* (2013.01); *H04N 5/2329* (2013.01); *H04N 5/23254* (2013.01); *H04N 5/23258* (2013.01); *H04N 5/23267* (2013.01); *H04N 5/23299* (2018.08); *G03B 2217/005* (2013.01)

(58) Field of Classification Search
CPC ............. H04N 5/23287; H04N 5/2329; H04N 5/2328; H04N 5/23299; H04N 5/23267; H04N 5/23254; H04N 5/23258; G02B 27/646; G03B 2217/005
See application file for complete search history.

(56) References Cited

U.S. PATENT DOCUMENTS

| 8,098,286 | B2 | 1/2012 | Nakakuki et al. | |
|---|---|---|---|---|
| 2014/0232886 | A1* | 8/2014 | Takayama | H04N 5/2328 348/208.6 |
| 2014/0267807 | A1* | 9/2014 | Miyahara | H04N 5/23274 348/208.3 |
| 2015/0097977 | A1* | 4/2015 | Watanabe | H04N 5/23258 348/208.2 |
| 2017/0347032 | A1* | 11/2017 | Kajimura | H04N 5/23245 |
| 2019/0281221 | A1* | 9/2019 | Kuwahara | H04N 5/23287 |

FOREIGN PATENT DOCUMENTS

JP    2009-152793 A    7/2009

* cited by examiner

*Primary Examiner* — Mekonnen D Dagnew
(74) *Attorney, Agent, or Firm* — McDermott Will & Emery LLP

(57) ABSTRACT

An object of the present disclosure is to continue optical image stabilization even in the case where a correcting lens is positioned near a mechanical end. An optical image stabilization module used to control a camera module adjusts the position of a correcting lens and the like used for optical image stabilization while executing the optical image stabilization during an exposure period. An image distortion accompanying the position adjustment of the correcting lens can be corrected by, for example, an electronic image stabilization module.

20 Claims, 22 Drawing Sheets

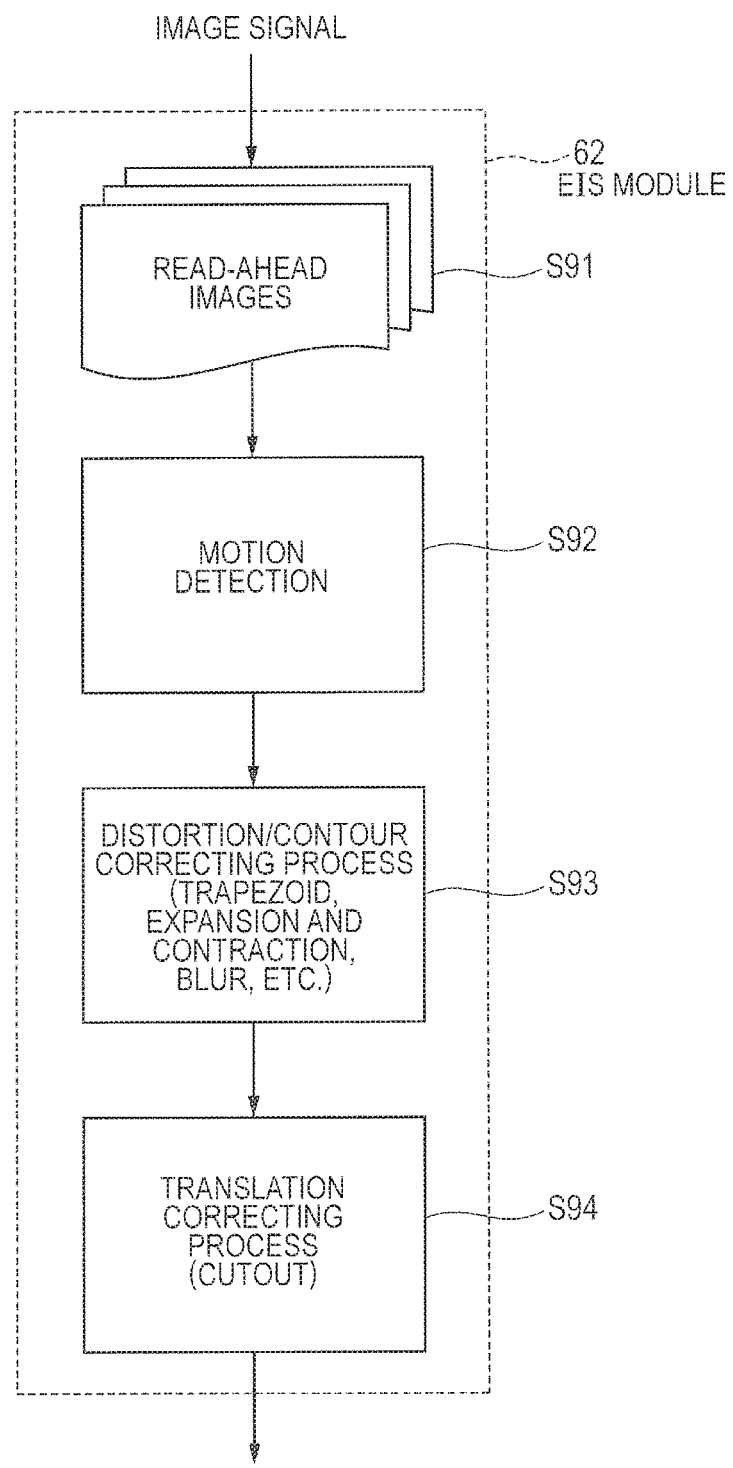

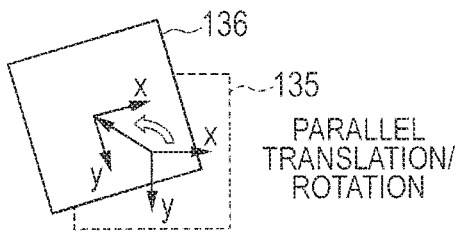
FIG. 4A  PARALLEL TRANSLATION/ ROTATION
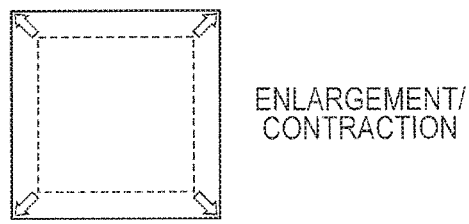
FIG. 4B  ENLARGEMENT/ CONTRACTION
FIG. 4C  HORIZONTAL TRAPEZOID DISTORTION
FIG. 4D  VERTICAL TRAPEZOID DISTORTION
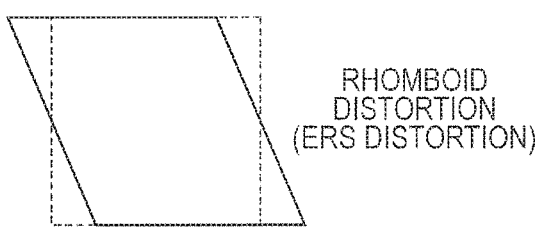
FIG. 4E  RHOMBOID DISTORTION (ERS DISTORTION)
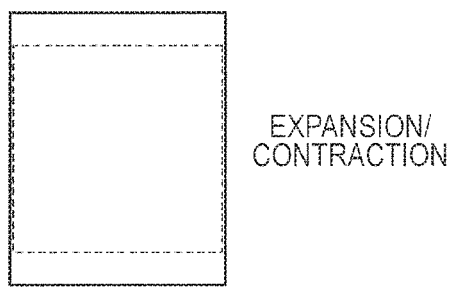
FIG. 4F  EXPANSION/ CONTRACTION

FIG. 5

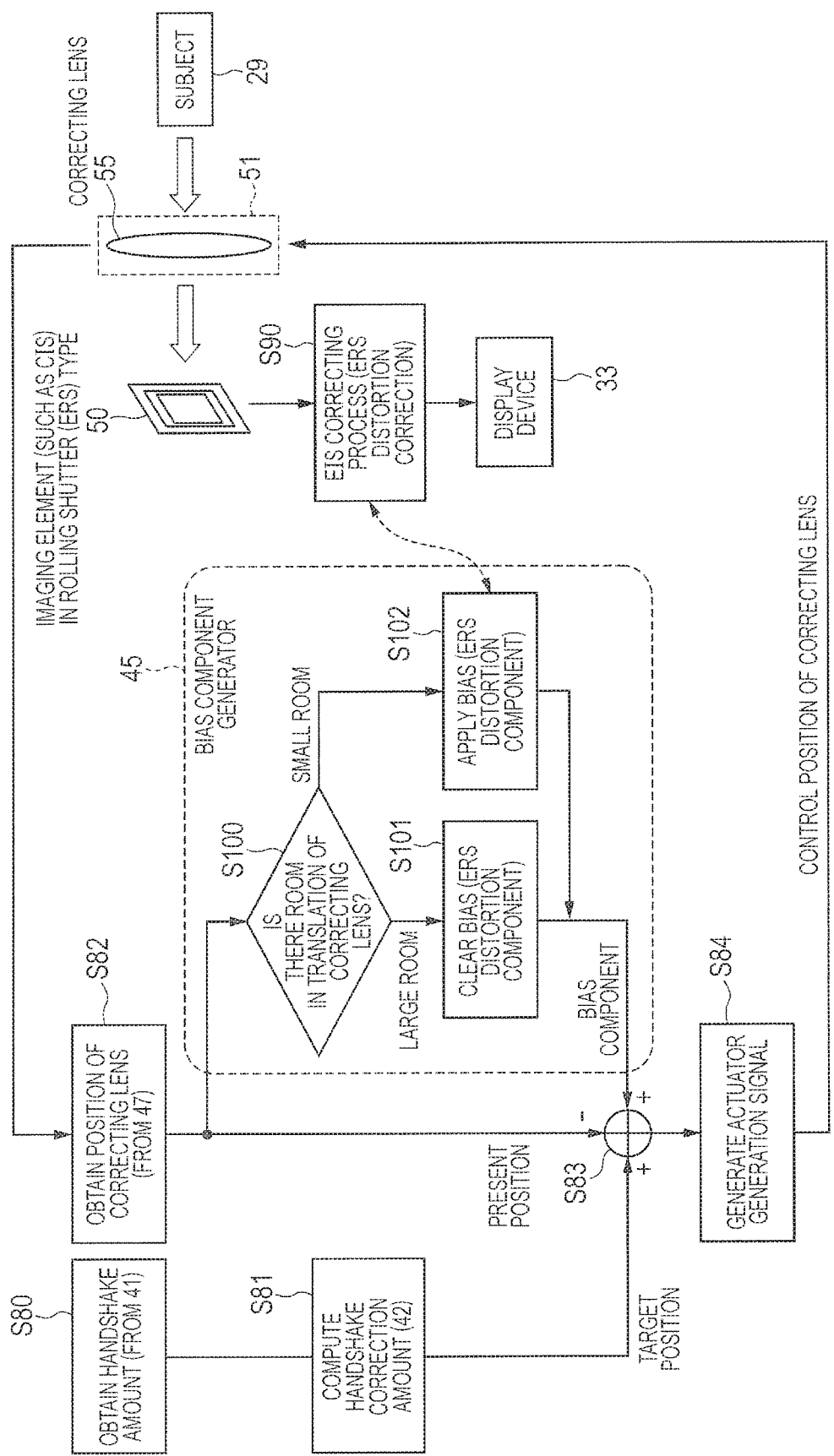

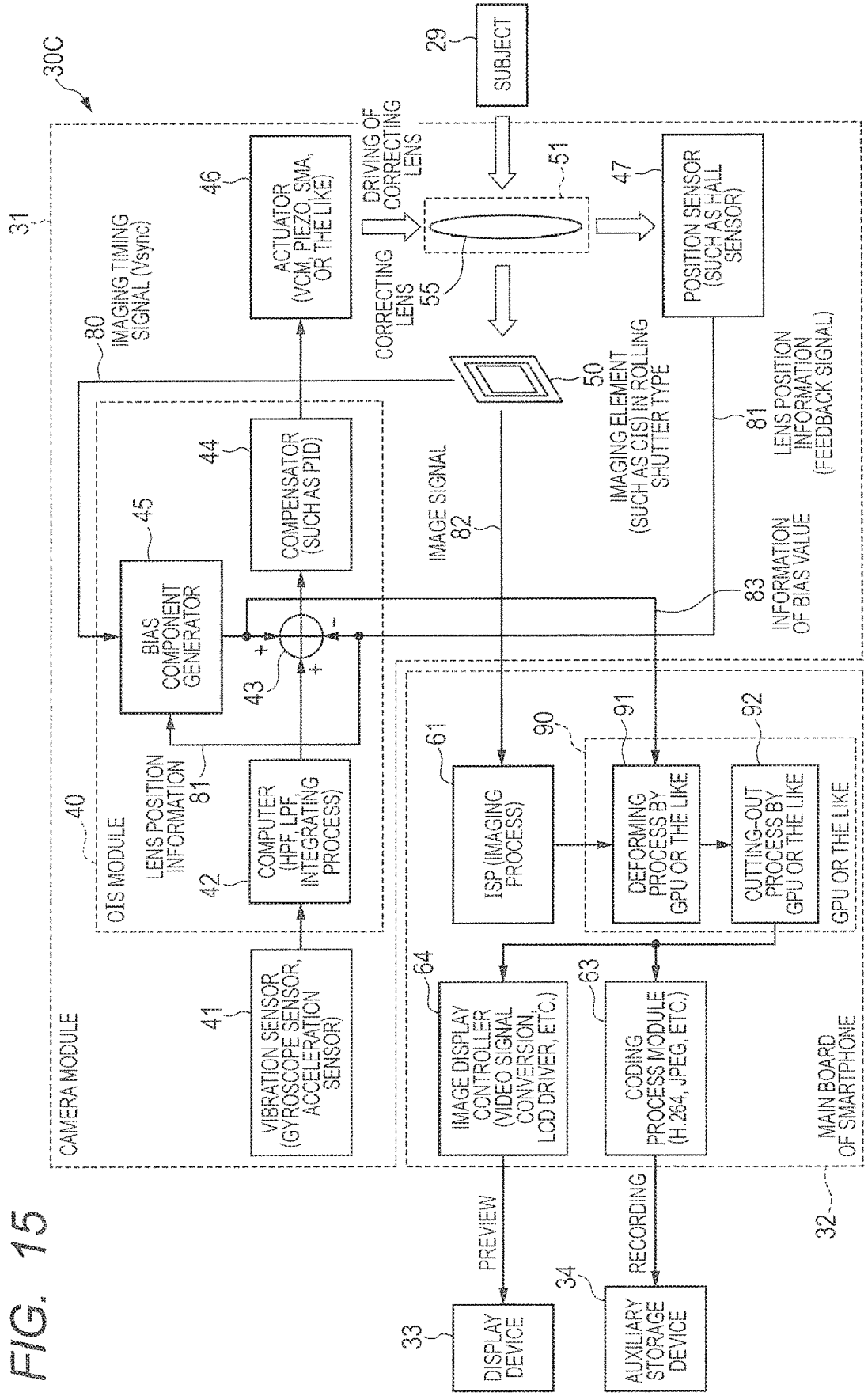

FIG. 16

| BIAS VALUE DETERMINING METHOD | ABSTRACT | USE CASE (APPLICATION) | MERIT (EFFECT) | DEMERIT |
|---|---|---|---|---|
| MECHANICAL CENTER RETURNING METHOD | METHOD OF MOVING CORRECTING LENS TO MECHANICAL CENTER IN THE FOLLOWING VERTICAL SYNC CYCLE REGARDLESS OF POSITION OF COLLECTING LENS AFTER END OF EXPOSURE PERIOD | SHOOTING WHILE WALKING, SPORTS CAMERA | AT THE START TIME OF ALL OF EXPOSURE PERIODS, CORRECTABLE RANGE BECOMES MAXIMUM. CONSEQUENTLY, THE METHOD IS SUITABLE TO A USE IN WHICH LARGE VIBRATION IS ASSUMED. | SINCE BIAS VALUE IS NOT CONSTANT AND ADJUSTMENT OF POSITION OF COLLECTING LENS AND EIS CORRECTION ACCOMPANYING IT IS PERFORMED FOR ALL OF FRAMES, PICTURE QUALITY IS LOWER THAN THAT IN OTHER METHODS. |
| BIAS VALUE FIXING METHOD (1/6) | METHOD OF MOVING LENS TO MECHANICAL CENTER DIRECTION AT ABOUT 1/6 OF DIAMETRAL CORRECTION ANGLE (0.5° WHEN CORRECTABLE RANGE IS ±1.5°) IN THE FOLLOWING VERTICAL SYNC CYCLE WHEN CORRECTING LENS IS POSITIONED NEAR MECHANICAL END AFTER END OF EXPOSURE PERIOD | PORTRAIT | SINCE BIAS VALUE IS FIXED, PRECISION OF RESTORING IMAGE DEFORMATION DUE TO POSITION ADJUSTMENT OF CORRECTING LENS BY EIS CAN BE EXPECTED. SINCE POSITION ADJUSTMENT OF CORRECTING LENS IS NOT PERFORMED WHEN HANDSHAKE IS SMALL, HIGH PICTURE QUALITY CAN BE EXPECTED. EVEN WHEN POSITION ADJUSTMENT OF CORRECTING LENS IS PERFORMED, SINCE BIAS VALUE IS SMALL, DETERIORATION IN PICTURE QUALITY IS SMALL. SINCE BIAS VALUE IS CONSTANT, CALCULATION IS UNNECESSARY AND PROCESS AMOUNT IS SMALL. | WHEN HANDSHAKE IS LARGE, THE POSSIBILITY THAT CORRECTING LENS DEVIATES FROM CORRECTABLE RANGE IS HIGH. |
| BIAS VALUE FIXING METHOD (1/3) (FIRST EMBODIMENT) | METHOD OF MOVING LENS TO MECHANICAL CENTER DIRECTION AT ABOUT 1/3 OF DIAMETRAL CORRECTION ANGLE (1.0° WHEN CORRECTABLE RANGE IS ±1.5°) IN THE FOLLOWING VERTICAL SYNC CYCLE WHEN CORRECTING LENS IS POSITIONED NEAR MECHANICAL END AFTER END OF THE EXPOSURE PERIOD | PORTRAIT | SINCE BIAS VALUE IS FIXED, PRECISION OF RESTORING IMAGE DEFORMATION DUE TO POSITION ADJUSTMENT OF CORRECTING LENS BY EIS CAN BE EXPECTED. SINCE POSITION ADJUSTMENT OF CORRECTING LENS IS NOT PERFORMED WHEN HANDSHAKE IS SMALL, HIGH PICTURE QUALITY CAN BE EXPECTED. SINCE BIAS VALUE IS CONSTANT, CALCULATION IS UNNECESSARY AND PROCESS AMOUNT IS SMALL. | |

SEMICONDUCTOR DEVICE AND ELECTRONIC DEVICE

CROSS-REFERENCE TO RELATED APPLICATIONS

The disclosure of Japanese Patent Application No. 2017-239339 filed on Dec. 14, 2017 including the specification, drawings and abstract is incorporated herein by reference in its entirety.

BACKGROUND

The present disclosure relates to a semiconductor device and an electronic device and, for example, is used for a semiconductor device controlling an image stabilization function of a camera, an electronic device on which a camera with an image stabilization function is mounted, and the like.

As image stabilization methods in a video camera, a digital camera, or the like, there are an OIS (Optical Image Stabilization: optical handshake correction) and an EIS (Electronic Image Stabilization: electronic handshake correction) (refer to, for example, Japanese Unexamined Patent Application Publication No. 2009-152793 (patent literature 1).

The OIS is to detect a handshake amount at the time of shooting by a vibration sensor such as a gyroscope sensor and adjust the position of a correcting lens, an imaging element, or the like so as to reduce a shake of an image on the basis of the detected handshake amount. The OIS has characteristics that a handshake in a high frequency range can be corrected with high precision and an effect of reducing a motion blur is high.

The EIS is a method of storing a captured image once in a buffer memory and comparing images captured at a plurality of time points, thereby calculating an amount of shifting caused by a handshake and making correction. Since the correction is made by deviating captured regions, an effective pixel region becomes smaller than a maximum pixel region of an imaging element. The EIS has characteristics that correction of an image distortion such as trapezoid or rhomboid, optical aberration correction, correction of a rolling shutter distortion, and correction of a distortion in the rotation direction with respect to the optical axis of a lens can be performed with high precision.

To obtain the characteristic correction effects of the OIS and the EIS at the same time, a correction method in which the OIS and the EIS are combined is employed in a digital camera, a smartphone with a camera, and the like of recent date.

SUMMARY

As described above, in the OIS, a handshake is corrected by shifting a correcting lens or the like in accordance with a shift direction and a shift amount corresponding to a handshake amount detected by a vibration sensor. Consequently, when shifting of the correcting lens is repeated for handshake correction, the correcting lens reaches the limit of the movable range (hereinbelow, called "mechanical end"). When the correcting lens reaches the mechanical end, a captured image is deformed to a degree that the image cannot be restored (hereinbelow, called "mechanical end distortion"). The reason is that handshake correction at high frequencies (for example, 30 Hz or higher) is not made by the OIS and, further, due to bounce of the correcting lens at the mechanical end, an unintended distortion component remains in an image signal.

As a method of solving the problem, when the possibility that the correcting lens reaches the mechanical end in motion picture capturing or the like is high, it is considered to return the position of the correcting lens to the center of the movable range in a blanking period between frames. However, when the correcting lens is moved largely at once, a large settling period becomes necessary. Consequently, it is necessary to make a frame blanking period long in order to assure the settling period. This contradicts a request to assure exposure time as long as possible for noise reduction of an imaging element.

The other problems and novel features will become apparent from the description of the specification and appended drawings.

A semiconductor device used for control of a camera module according to an embodiment performs position adjustment of a correcting lens or the like used for optical image stabilization while executing optical image stabilization during an exposure period. An image distortion accompanying the position adjustment of the correcting lens can be corrected by, for example, electronic image stabilization.

According to the embodiment, also in the case where the correcting lens is positioned near the mechanical end, the optical image stabilization can be continued.

BRIEF DESCRIPTION OF THE DRAWINGS

FIG. 3 is a flowchart illustrating the procedure of a handshake correcting process by an EIS module.

FIGS. 4A to 4F are diagrams illustrating examples of image distortions which can be corrected by the EIS.

FIG. 5 is a diagram for explaining a rolling shutter distortion.

FIG. 6 is a diagram for explaining the operation of an OIS module in FIG. 1.

FIG. 15 is a block diagram illustrating another configuration example of an electronic device of a second embodiment.

FIG. 16 is a diagram illustrating a method of determining a bias value for adjusting the position of a correcting lens in a table form.

DETAILED DESCRIPTION

Figure 1:
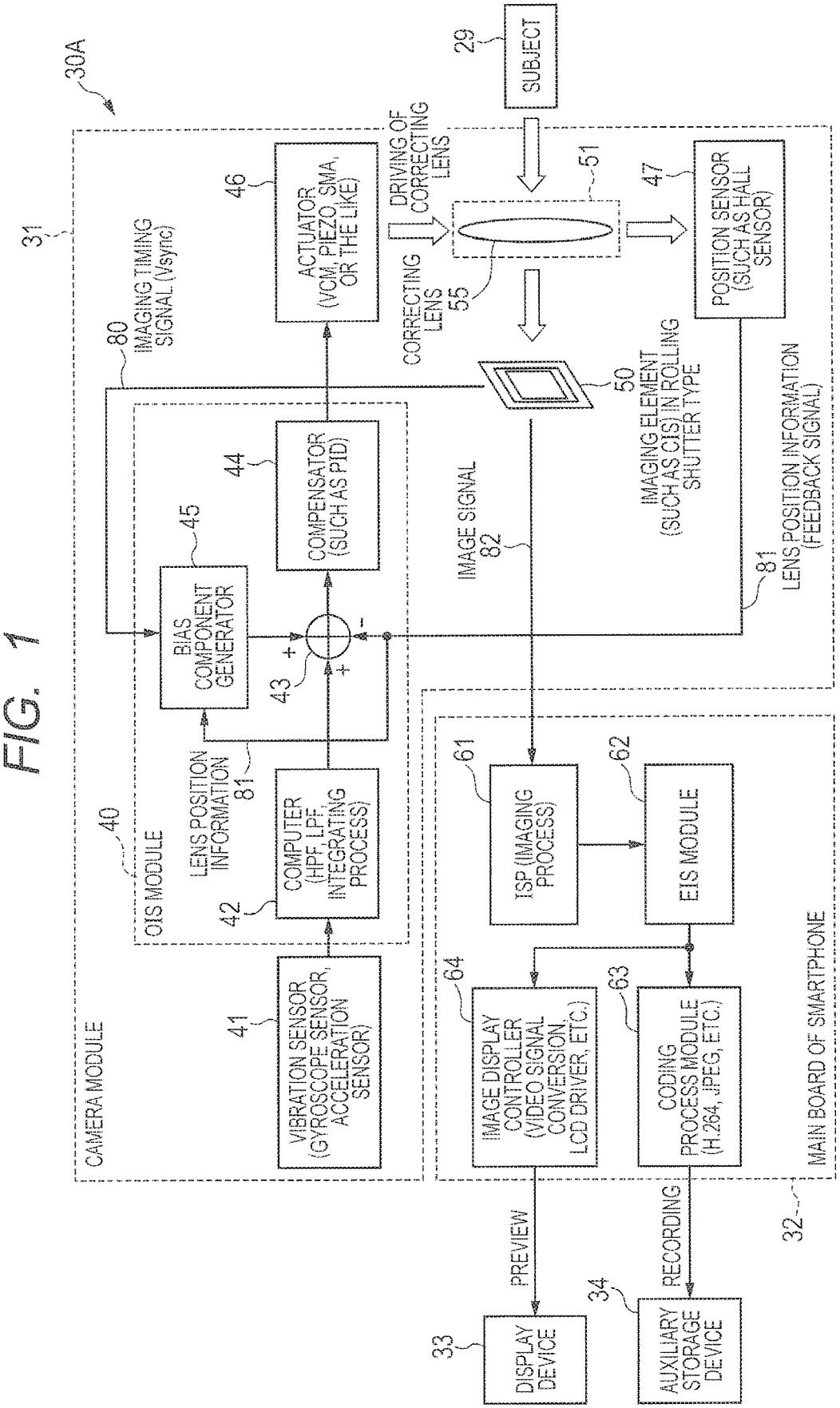
FIG. 1 is a block diagram illustrating an example of the configuration of an electronic device 30A according to a first embodiment.

Hereinafter, embodiments will be described specifically with reference to the drawings. The same reference numeral is designated to the same or corresponding parts and, in some cases, the description of the part is not repeated.

First Embodiment

FIG. 1 is a block diagram illustrating an example of the configuration of an electronic device 30A according to a first embodiment. In the following, description will be given on assumption of a smartphone with a camera module as the electronic device 30A. However, the technique of the present disclosure can be applied also to another electronic device 30A with a camera module. For example, the electronic device 30A includes a surveillance camera system.

Although handshake correction of a lens shift method of shifting a collecting lens as the method of the OIS will be described as an example in the present disclosure, the technique of the present disclosure can be also applied to an OIS of another type. For example, the handshake correction can be made by shifting an entire optical system or the handshake correction can be made by shifting an entire unit including an optical system and an image sensor. Alternatively, the technique of the present disclosure can be applied also to handshake correction of an image sensor shift method of performing handshake correction by shifting an imaging element.

In the present disclosure, the correcting lens, the optical system, the imaging element, and the like which are shifted to realize the optical image stabilization will be generally called movable objects. Therefore, a movable object is at least a part of the optical system and the imaging element.
General Configuration of Electronic Device Referring to FIG. 1, the electronic device 30A has, as a configuration related to a camera, a camera module 31, a main board 32, a display device 33, and an auxiliary storage device 34.

1. Configuration of Camera Module

The camera module 31 includes an optical system 51 including a correcting lens 55, an imaging element (also called "imaging sensor") 50, a shake sensor 41, an actuator 46, a position sensor 47, and an OIS module 40. The shake sensor 41, the actuator 46, the position sensor 47, and the OIS module 40 are used for optical image stabilization (OIS).

Figure 2:
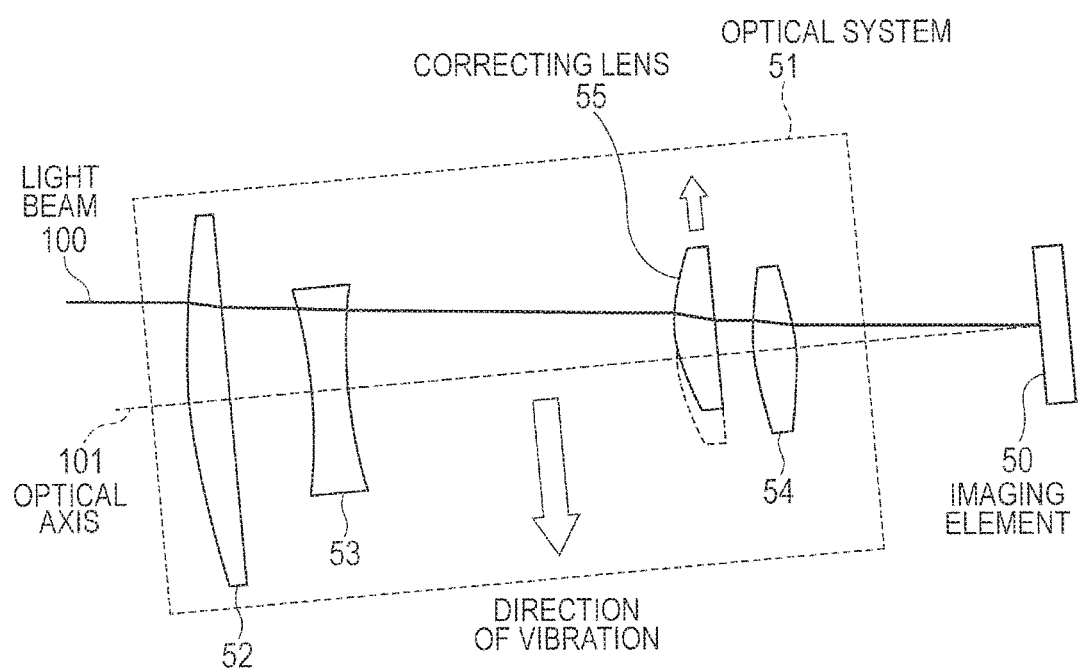
FIG. 2 is a diagram schematically illustrating an example of the configuration of an optical system 51.

FIG. 2 is a diagram schematically illustrating an example of the configuration of the optical system 51. The optical system 51 includes optical lenses 52, 53, and 54, the correcting lens 55, and a diaphragm (not illustrated).

A light ray 100 from the subject enters the optical lenses 52, 53, and 54. An image of the subject is formed on the imaging element 50 by the optical lenses 52, 53, and 54. The optical lenses 52, 53, and 54 are arranged so that an optical axis 101 passes the center of the imaging element 50.

The imaging element 50 is a device of converting an optical image of the subject to an electric signal and is, for example, a CMOS image sensor (also called a Complementary Metal-Oxide-Semiconductor image sensor). In the imaging element 50, a rolling shutter method of capturing images by sequentially exposing every line or some lines is employed.

The correcting lens 55 is configured so as to be movable in a plane almost perpendicular to the optical axis 101 or the angle with respect to the optical axis can be changed and corrects a shake (blur) of an image of the subject due to a handshake. Concretely, the correcting lens 55 reduces a shake of an optical image of the subject on the imaging element 50 by shifting only by an amount according to the shake amount of the optical system 51 in a direction opposite to the direction of the shake of the optical axis 101 of the optical system 51 due to the handshake.

In the case of a correcting lens of a concave shape, by shifting the collecting lens in the same direction as the direction of the shake of the optical axis 101 of the optical system 51 due to a handshake, a shake of an optical image of the subject on the imaging element 50 can be reduced. In the case of the sensor shift type of shifting the imaging element 50, by shifting the imaging element 50 in the direction opposite to the direction of the shake of the optical axis 101 of the optical system 51 due to the handshake, the shake of the optical image of the subject on the imaging element 50 can be reduced. In such a manner, the operation direction of a movable object with respect to the handshake direction differs depending on the configuration of a correction optical system or the EIS method.

Hereinafter, in the case where the correcting lens 55 is in an initial position (center of the movable range), the optical axis direction of the optical system 51 is set as a z-axis direction, the lateral direction of the imaging element 50 in a plane perpendicular to the z axis is set as an x-axis direction, and the vertical direction of the imaging element 50 is set as a y-axis direction. The rotation around the x axis is called a pitch, the rotation around the y axis is called a yaw, and the rotation around the z axis is called a roll.

Referring again to FIG. 1, the shake sensor 41 detects the direction of a shake and a shake amount of the entire camera module 31 including the optical system 51. The shake sensor 41 is, for example, a gyroscope sensor (also called an angular velocity sensor) or an acceleration sensor. A gyroscope sensor detects angular velocity in the yaw direction and the pitch direction (if necessary, the roll direction) using the optical axis of the camera as a reference. An acceleration sensor detects acceleration in the x-axis direction perpendicular to the optical axis and the y-axis direction (if necessary, the z-axis direction). Both of a gyroscope sensor and an acceleration sensor may be provided.

The actuator 46 shifts the correcting lens 55 in a plane perpendicular to the optical axis of the optical system 51 on the basis of a control signal from the OIS module 40. The actuator 46 is, for example, a voice coil motor (VCM), a piezo element, or a shape memory alloy (SMA) actuator.

The position sensor 47 detects the position of the correcting lens 55. The position sensor 47 is, for example, a Hall sensor. The Hall sensor is constructed by a Hall element for detecting the position of a permanent magnet fixed to the frame of the correcting lens 55.

The OIS module 40 drives the correcting lens 55 by the actuator 46 so as to decrease a shake of an optical image on the imaging element 50 on the basis of the shake direction and the shake amount of the optical system 51 detected by the shake sensor 41. Further, when the correcting lens 55 approaches the mechanical end, the OIS module 40 drives the correcting lens 55 in a predetermined direction (direction toward almost the center (called "mechanical center") of the movable range of the correcting lens 55) by the actuator 46 so that the correcting lens 55 is apart from the mechanical end. Those position controls of the correcting lens 55 are executed by feedback control based on the present position of the correcting lens 55 detected by the position sensor 47.

A characteristic point is that, in the camera module 31 of the embodiment, shifting of the correcting lens 55 for handshake correction based on a detection value of the shake sensor 41 and shifting of the correcting lens 55 so as to be apart from the mechanical end are performed simultaneously during an exposure period. The latter position adjustment of the correction lens 55 is not based on the detection value of the shake sensor 41. Although a distortion occurs in an image captured by the imaging element 50 by driving the correcting lens 55 in a predetermined direction so as to be apart from the mechanical end, it is assumed that the distortion is eliminated by the EIS which is executed after that. Since the driving of the correcting lens 55 so as to be apart from the mechanical end is slowly performed in the period of one frame, a problem of settling time does not occur.

2. Detailed Configuration of OIS Module

As a more detailed configuration, the OIS module 40 includes a computer 42, a bias component generator 45, an adder 43, and a compensator 44. In the disclosure, in some cases, the computer 42 is called a first computer, the bias component generator 45 is called a second computer, and an EIS module 62 (or an image processor 90 or the like) is called a third computer.

The computer 42 calculates the shift direction and the shift amount (concretely, the shift amount in the x-axis direction and the shift amount in the y-axis direction, the shift amount in the pitch-axis direction and the shift amount in the yaw-axis direction, or the like) from the present position of the correcting lens 55 on the basis of the detection value of the shake sensor 41. In the following description, the shift direction and the shift amount will be called a handshake correction component vector.

For the above-described calculation, first, the computer 42 eliminates an offset component by applying a high pass filter (HPF) to an output signal of the shake sensor 41 and eliminates a noise component by applying a low pass filter (LPF). Subsequently, the computer 42 calculates a shake amount of each axis by performing an integrating process on an output signal subjected to the filter process.

Concretely, in the case where the shake sensor 41 is constructed by a gyroscope sensor, by integrating the angular speeds of the yaw angle and the pitch angle detected by the gyroscope sensor, an angle deviation is obtained as a shake amount of the yaw angle and the pitch angle. When the shake sensor 41 is constructed by an acceleration sensor, by integrating the accelerations in the x-axis direction and the y-axis direction detected by the acceleration sensor, the speeds in the x-axis direction and the y-axis direction are determined. By further integrating the speeds, a shift deviation is obtained as shake amounts in the x-axis direction and the y-axis direction. A shift deviation may be converted to an angle deviation on the basis of the distance from the camera to the subject.

Finally, the computer 42 calculates the shift direction and the shift amount from the present position of the correcting lens 55 for handshake correction (that is, the shift amounts in the x-axis direction and the y-axis direction, the shift amounts in the pitch-axis direction and the yaw-axis direction, or the like) by multiplying the shake amount of each axis calculated as described above with a coefficient, and outputs a calculation result.

Whether the handshake correction amount obtained finally is expressed as shift amounts in the x-axis direction and the y-axis direction or the pitch angle and the yaw angle may be determined according to an optical image stabilization mechanism mounted in the camera module 31 for convenience. For example, in the case of the image sensor shift type, it is desirable to express the handshake correction amount as the shift amounts in the x-axis direction and the y-axis direction. As another example, when the shift amounts in the x-axis direction and the y-axis direction become dominant at the time of high imaging magnification such as macro shooting, it may be more convenient to express the handshake correction amount by shift amounts in the x-axis direction and the y-axis direction.

When the handshake correction amount is relatively small, as will be described later, a linear shift amount and a shift angle can be mutually converted by using the relation between the angle of view and the size of the image sensor. Therefore, in the following description, although there is a case that the handshake correction amount is expressed as a linear shift amount and there is also a case that the handshake correction amount is expressed as a shift angle, it is not intended to limit any one of the cases. The technique of the present disclosure can be applied to any of the expression methods.

The bias component generator 45, first, determines whether the present position of the correcting lens 55 is near the mechanical end (that is, in the range of the threshold distance from the mechanical end) or not on the basis of position information 81 of the correcting lens 55 output from the position sensor 47. In the case where the correcting lens 55 shifts to a position near the mechanical end, the bias component generator 45 outputs a signal expressing a shift amount in each of the shift direction and a control cycle of the correcting lens 55 so as to gradually shift the correcting lens 55 in a predetermined direction toward an almost center position of the movable range of the correcting lens 55 so as to be apart from the mechanical end. The shift direction and the shift amount of each control cycle of the correcting lens 55 are, for example, shift amounts in each of the control cycles in the x-axis direction and the y-axis direction or shift amounts in each of the control cycles in the pitch-axis direction and the yaw-axis direction. Hereinafter, the shift direction and the shift amount in this case will be called a bias component vector. The shift amount for the position adjustment of the correcting lens 55 is preferably a predetermined value.

On the other hand, until the correcting lens 55 shifts from an initial position (usually, the mechanical center) to a position near the mechanical end or until the correcting lens 55 returns to a position near the center of the movable range and shifts again to a position near the mechanical end, an output of the bias component generator 45 is zero.

In the embodiment, based on an imaging timing signal (for example, vertical sync signal Vsync) 80 output from the imaging element 50, the bias component generator 45 adjusts so that shift start time and shift end time of the correcting lens 55 lie in a frame blanking period between exposure periods. Specifically, the shift start and the shift end of the correcting lens 55 are prevented from exerting an influence on image data so that correction by the EIS is easy. The details will be described with reference to FIG. 10.

The adder 43 combines the shift direction and the shift amount (that is, correction component vector) of the correcting lens 55 output from the computer 42 and the shift direction and the shift amount (that is, bias component vector) of the correcting lens 55 output from the bias component generator 45, thereby determining a final shift direction and a final shift amount (that is, a target position of the correcting lens 55) from the present position of the correcting lens 55. The adder 43 outputs a signal expressing a deviation from the present position to the target position of the correcting lens 55 output from the position sensor 47.

The compensator 44 generates a control signal for the actuator 46 on the basis of the deviation output from the adder 43. The compensator 44 is constructed by, for example, a PID controller in which a proportional element (P), an integration element (I), and a differentiation element (D) are coupled in parallel.

3. Configuration of Main Board.

In the main board 32 of the electronic device 30A, a plurality of processors, a memory, a dedicated control circuit, and the like are mounted. Particularly, as a configuration related to control of the camera of the present application, the electronic device 30A has an image signal processor (ISP) 61, the EIS module 62, an encoding process module 63, and an image display controller 64.

Those components may be constructed by at least one dedicated circuit as an SoC (System on Chip) or constructed by realizing a part of the functions by a dedicated circuit and realizing the rest of the functions by executing a program by a general processor. A general processor in this case includes a CPU (Central Processing Unit), a GPU (Graphics Processing Unit), and the like.

The image signal processor 61 performs imaging process on a raw image signal 82 (also called raw data) output from the imaging element 50. For example, the image signal processor 61 performs correction of the optical system, correction of a defective pixel, and correction of brightness, color, edge, and the like for noise elimination and higher picture quality.

The EIS module 62 calculates a shift amount by a handshake and performs a correction so that a subject lies in the same picture plane by comparing images captured in adjacent frames. The operation of the EIS module 62 will be described later with reference to FIGS. 3 and 4.

The encoding process module 63 converts the data format of an image signal so as to store an image corrected by the EIS into the auxiliary storage device 34. For example, as compression coding of motion image data, the H.264 (MPEG-4 Part 10 Advanced Video Coding) is normally used. As compression coding of a still image, the JPEG (Joint Photographic Experts Group) is used. Although the kind of the auxiliary storage device 34 is not limited, for example, a memory card, a USB (Universal Serial Bus) memory, or the like is used.

The image display controller 64 is an integration circuit for displaying an image signal corrected by the EIS module 62 to the display device 33. The image display controller 64 and the display device 33 are used for a preview for checking the composition of shooting.

Concretely, the image display controller 64 converts the image signal corrected by the EIS module 62 to a video signal such as an RGB signal according to the display device 33. Further, the image display controller 64 includes a driver for driving the display device 33. Although the kind of the display device 33 is not limited, for example, an LCD (Liquid Crystal Display), an organic electro-luminance (EL) display, or the like is used as the display device 33.

EIS

Hereinafter, the general operation of the EIS module used in the embodiment will be described.

FIG. 3 is a flowchart illustrating the procedure of a handshake correcting process by the EIS module. Referring to FIG. 3, in the first step S91, an image signal subjected to the image process performed by the image signal processor 61 is input to the EIS module 62. As the image signal, in addition to an image at the present time point, one or plural read-ahead images (for example, an image one frame before) is/are input.

In the following step S92, the EIS module 62 detects the direction of the motion of the camera by comparing images at a plurality of time points.

In the following step S93, the EIS module 62 corrects distortion which occurs in an image, for example, deformation of a contour caused by an ERS distortion on the basis of the detected motion of the camera.

In the following step S94, the EIS module 62 performs correction of changing an effective image region (in other words, correction of cutting out a part of a pixel region which can be imaged) so that the composition is not changed by the detected motion of the camera.

In the case of the embodiment, a distortion in an image caused by a handshake is almost perfectly corrected by the OIS. Therefore, in the EIS, a distortion (mainly, a rolling shutter distortion) caused when the correcting lens 55 is shifted during shooting is corrected. That is, detection of a motion of the camera corresponds to detection of a motion of the correcting lens 55 in the case of the embodiment.

FIGS. 4A to 4F are diagrams illustrating examples of image distortions which can be corrected by the EIS. In each of FIGS. 4A to 4F, a contour line 135 (broken line) of an image of a subject when there is no distortion and a contour line 136 (solid line) of an image of a subject when a distortion occurs are illustrated. The contour line 135 of the subject in the case where there is no distortion has a rectangular shape. A distortion in each of FIGS. 4A to 4F can be corrected by many of EIS.

FIG. 4A illustrates an example of a distortion that the contour of an image shifts in parallel or turns.

FIG. 4B illustrates an example of a distortion that the contour of an image enlarges or reduces (that is, zooming).

FIGS. 4C and 4D illustrate examples that the contour of an image is distorted in trapezoid shapes in the horizontal and vertical directions, respectively (that is, trapezoid distortions).

FIGS. 4E and 4F illustrate examples of the electrical rolling shutter (ERS) distortions which are seen in a CMOS image sensor or the like. The distortion occurs since imaging elements of the rolling shutter type sequentially read images line by line (or every plural lines). As illustrated in FIG. 4E, when the camera moves in the lateral direction relative to the subject, the contour line of the subject is deformed from a rectangular shape to a parallelogram. On the other hand, as illustrated in FIG. 4F, when the camera moves in the vertical direction relative to the subject, the contour line of the subject expands or contracts in the vertical direction.

In the case of the embodiment, mainly, the imaging element of the rolling shutter type is assumed. In this case, by shifting of the correcting lens 55 in a predetermined direction so as to be apart from a position near the mechanical end, a rolling shutter distortion illustrated in FIG. 4E or 4F occurs.

Figure 5:
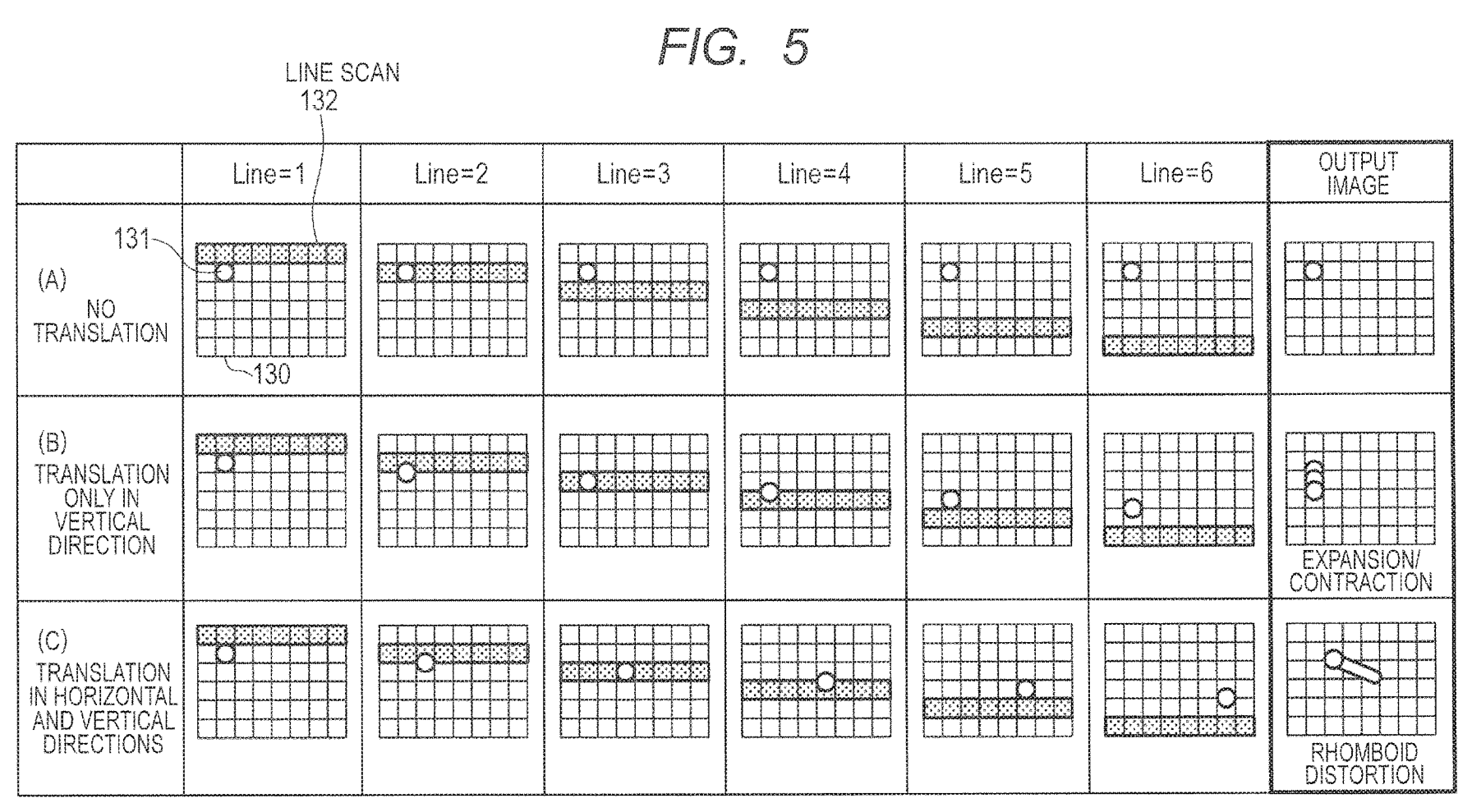

FIG. 5 is a diagram for explaining a rolling shutter distortion. FIG. 5 illustrates a state where an optical image 131 of the subject is formed on the surface 130 of an image element. The imaging element executes a sequential line scan 132 in order of Line=1 to 6. In the following description, only the shifting of the correcting lens 55 based on an output of the bias component generator 45 described with reference to FIG. 1 is considered, and handshake correction is not considered.

Referring to (A) of FIG. 5, when the correcting lens 55 does not shift, the position of the optical image 131 on the surface 130 of the image element remains constant and does not shift. Therefore, no distortion occurs in an output image.

Referring to (B) of FIG. 5, when the correcting lens 55 shifts in the perpendicular direction (that is, the direction perpendicular to lines and parallel to the scan direction) during an exposure period, the position of the optical image 131 on the surface 11 of the image element also shifts in the perpendicular direction. Therefore, a distortion in the perpendicular direction occurs in an output image. When the contour of the optical image is a rectangular shape, as illustrated in FIG. 4F, the contour expands or contracts in the perpendicular direction.

Referring to (C) FIG. 5, when the correcting lens 55 shifts in the horizontal and vertical directions (that is, oblique direction) during an exposure period, the position of the optical image 131 on the surface 130 of the image element also shifts in an oblique direction. Therefore, a distortion (rhomboid distortion) in the oblique direction occurs in an output image. When the contour of an optical image has a rectangular shape, the contour is deformed to a parallelogram as illustrated in FIG. 4F.

Operation of OIS Module

FIG. 6 is a diagram for explaining the operation of the OIS module in FIG. 1. Hereinafter, referring to FIGS. 1 and 6, the operation of the OIS module 40 in the electronic device 30A of the embodiment will be described more specifically.

In the OIS module 40 in the embodiment, an object is to continue the optical image stabilization without being limited by the mechanical end. To achieve the object, when the correcting lens 55 is positioned near the mechanical end (that is, within the range of threshold distance from the mechanical end) as a result of repeating handshake correction, the OIS module 40 executes the optical image stabilization while shifting the correcting lens 55 so as to be apart from the mechanical end. Therefore, at the time of generating a drive signal of the correcting lens 55, the handshake correction component and the bias component in a predetermined direction are combined. In the specification, the shift amount in the predetermined direction of the correcting lens 55 is called a bias component.

Concretely, in step S80 in FIG. 6, the OIS module 40 obtains information of the handshake amount from the shake sensor 41 such as a gyroscope sensor. In the following step S81, the computer 42 of the OIS module 40 computes a correction amount (that is, a handshake correction component vector) every coordinate axis of the correcting lens 55 so as to eliminate a shake of an optical image on the imaging element 50 on the basis of the obtained handshake amount.

In parallel with the above, in step S82, the OIS module 40 obtains position information of the correcting lens 55 from the position sensor 47 such as a Hall sensor. In the following step S100, the bias component generator 45 of the OIS module 40 determines whether there is room for shifting of the correcting lens 55 with the mechanical end on the basis of the position information of the correcting lens 55. When there is a shift room which is equal to or larger than a threshold (large room), in the following step S101, the bias component generator 45 clears the bias component which is output to zero. On the other hand, when there is hardly shift room of the correcting lens 55 with the mechanical end (small room), in the following step S102, the bias component generator 45 outputs a shift direction and a shift amount (that is, bias component vector).

In step S83, the adder 43 of the OIS module 40 determines the target position of the correcting lens 55 by combining the handshake correction component vector and the bias component vector for feedback control of the position of the correcting lens 55. The adder 43 outputs a deviation from the present position of the correcting lens 55 detected by the position sensor 47 to a target position.

In the following step S84, the compensator 44 of the OIS module 40 generates a drive signal for driving the actuator 46 on the basis of the deviation.

As described above, by performing the handshake correction while shifting the correcting lens 55 in a predetermined direction (concretely, almost mechanical center direction), a deformation of an image caused by a handshake is solved. However, the influence of the shifting of the correcting lens 55 in the predetermined direction remains. Concretely, in an image captured by the imaging element 50, a distortion such as a rolling shutter distortion occurs and the center of a captured image (in other words, the angle of view) changes. Such a deformation of an image is corrected by the EIS module 62 in the following step S90.

To summarize the above, when the correcting lens 55 is positioned near the mechanical end and the possibility that the correcting leans 55 reaches the mechanical end during an exposure period is high, on precondition that the correcting process is performed by the EIS, the OIS module 40 shifts the correcting lens 55 toward the mechanical center while intentionally making an image corrected by the OIS distorted (the image is deformed). By the operation, while avoiding deviation from the movable range of the correcting lens 55 as a movable object, the quality of a final output image can be also assured.

To use the above-described method, a distortion of an image which is caused by shifting in a predetermined direction of the correcting lens 55 has to be one which can be corrected by the EIS. Consequently, the imaging element 50 is desirably of the rolling shutter type. In this case, a rolling shutter distortion is caused by shifting in a predetermined direction (concretely, mechanical center direction) of the correcting lens 55, and the rolling shutter distortion can be corrected by the EIS.

Concretely, in the case of shifting the correcting lens 55 in a predetermined direction at predetermined speed during an exposure period, for example, as described with reference to FIGS. 4E and 5C, an optical image of a subject having a rectangular contour is deformed to a parallelogram. Such a change in the shape can be easily corrected by the EIS. However, whether a distortion in an image caused by shifting of the correcting lens 55 can be corrected by the EIS or not depends on the correction ability of the EIS module 62. Consequently, it is not always necessary to move the correcting lens 55 at predetermined speed. The ability of correcting a rolling shutter distortion by the EIS also depends on the characteristics of the imaging element 50 such as electronic shutter speed.

Change in Output Image

Hereinafter, comparing to the case where the position of the correcting lens is not returned to the mechanical center even when it becomes close to the mechanical end, how an output image changes in the case of the embodiment will be described.

FIGS. 7A to 7D are diagrams for explaining basic operation of the OIS.

Figure 7A:
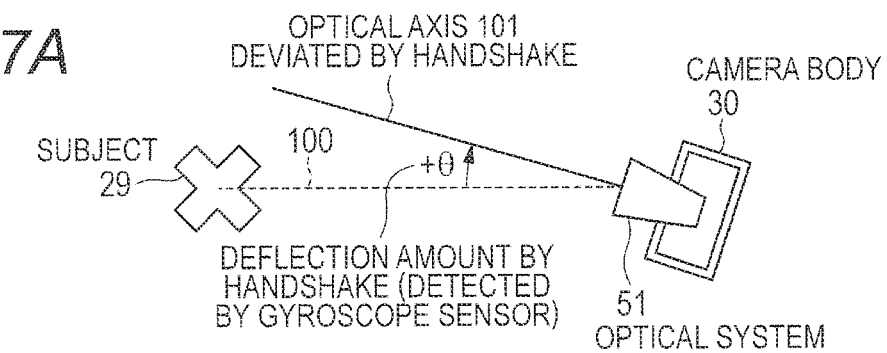
FIGS. 7A to 7D are diagrams for explaining basic operation of the OIS.

FIG. 7A is a diagram illustrating the relation between the optical axis 101 of a camera when a handshake occurs and a subject 29. As illustrated in FIG. 7A, the direction of the optical axis 101 of the optical system 51 moves from the direction 100 toward the subject 29 only by a shake amount of +θ. The shake amount can be obtained on the basis of a detection value of the gyroscope sensor.

Figure 7B:
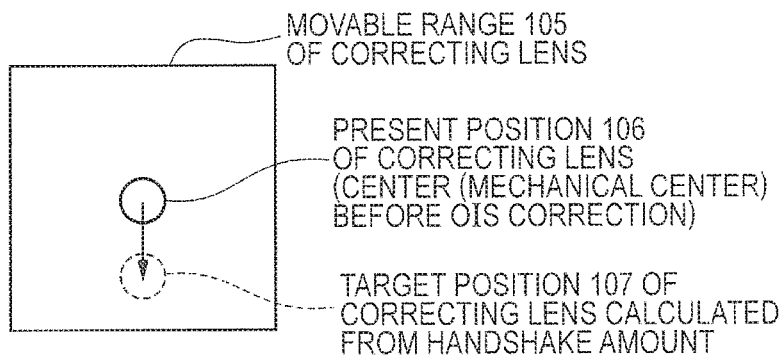

FIG. 7B schematically illustrates the center position of the correcting lens 55 in the state of FIG. 7A. Referring to FIG. 7B, position 106 of the center of the correcting lens 55 before OIS correction is performed is the center (that is, mechanical center) of a movable range 105 in the center of the correcting lens 55. The computer 42 of the OIS module 40 calculates a target position 107 in the center of the correcting lens 55 on the basis of the handshake amount (+θ) detected by the gyroscope sensor.

Hereinafter, for the sake of ease, the center position of the correcting lens 55 will be simply called the position of the correcting lens 55, and the movable range 105 in the center of the correcting lens 55 will be simply called the movable range 105 of the correcting lens 55.

Figure 7C:
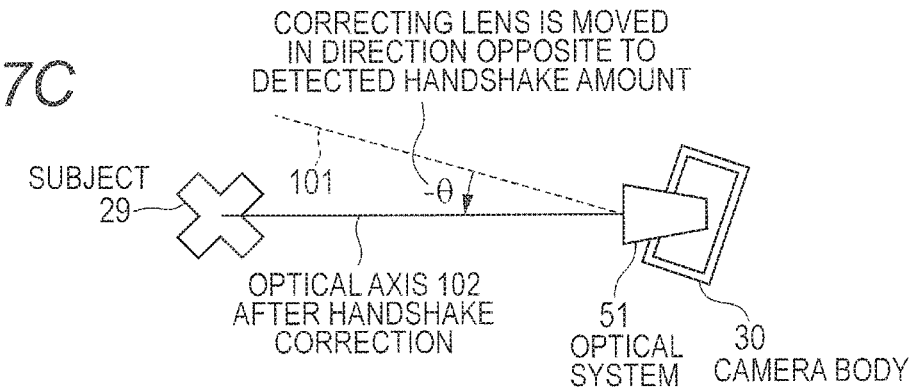

FIG. 7C illustrates a state where a handshake correction is performed to correct the shake amount (+θ) depicted in FIG. 7A. As illustrated in FIG. 7C, by shifting the actuator 46, the OIS module 40 moves the correcting lens 55 in the direction opposite to the detected shake amount (+θ). Consequently, the optical axis 102 of the optical system 51 after the optical image stabilization matches the direction of the subject 29.

Figure 7D:
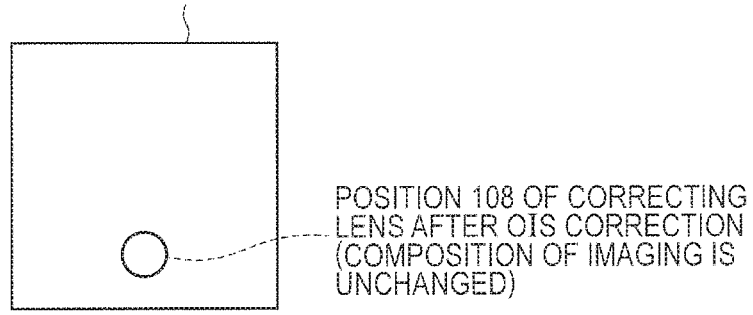

FIG. 7D schematically illustrates the position of the correcting lens 55 in the state of FIG. 7C. Referring to FIG. 7D, by the optical image stabilization, position 108 of the correcting lens 55 changes to the target position 107 in FIG. 7B. That is, the position 108 of the correcting lens 55 becomes close to the end of the movable range 105 more than the first mechanical center. In the optical image stabilization, since the position of the correcting lens 55 is adjusted so that the subject 29 is in the center of the screen, the composition of the imaging is unchanged.

Figure 8:
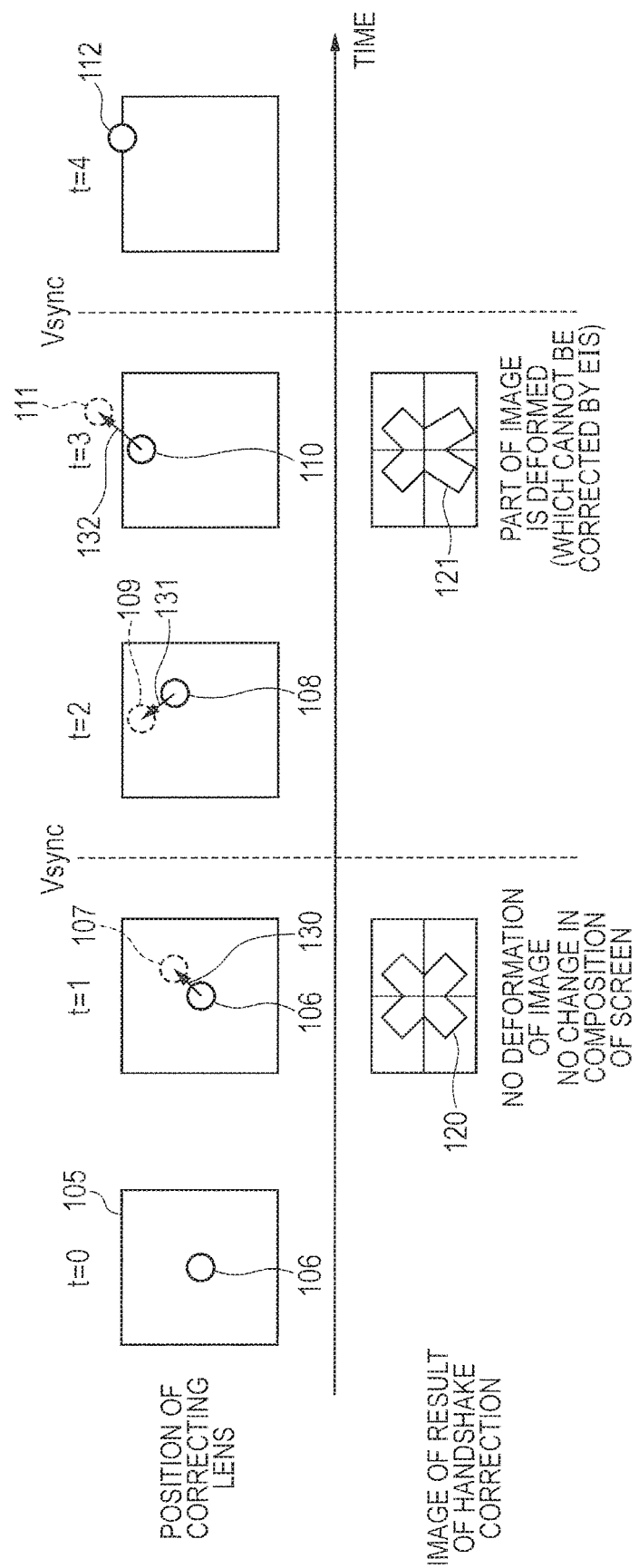
FIG. 8 is a diagram schematically illustrating a change in the position of a correcting lens and an image at the time of correcting handshake by an OIS module of a comparison example.

FIG. 8 is a diagram schematically illustrating a change in the position of the correcting lens and an image at the time of image stabilization by an OIS module of a comparison example. FIG. 8 illustrates the position of the correcting lens 55 in the movable range 105 and an image output as a result of the handshake correction. Time elapses in the order of time t=0, t=1, t=2, t=3, and t=4. In the OIS module of the comparative example, it is assumed that even the position of the correcting lens 55 becomes close to the mechanical end, the position of the correcting lens 55 is not returned to the mechanical center.

At time t=0, the correcting lens 55 is in an initial state before the OIS correction is performed. In this case, the present position 106 of the correcting lens 55 is in the center (that is, mechanical center) of the movable range 105 of the correcting lens 55.

At time t=1, based on the detection result of the handshake amount by the gyroscope sensor, the computer 42 calculates the shift direction and the shift amount (that is, handshake correction component vector 130) of the correcting lens 55 for handshake correction. Based on the handshake correction component vector 130, the target position 107 of the correcting lens 55 is determined.

After that, the correcting lens 55 is driven by the actuator 46 and shifts from the present position 106 to the target position 107. As a result, no deformation occurs in an image 120 captured. The captured image 120 is in the center of the screen and the composition of the screen is not changed.

At time t=2, based on the detection result of the handshake amount by the gyroscope sensor, the computer 42 calculates the shift direction and the shift amount (that is, handshake correction component vector 131) of the correcting lens 55 for handshake correction. Based on the handshake correction component vector 131, target position 109 of the correcting lens 55 is determined. After that, the correcting lens 55 is driven by the actuator 46 and shifts from the present position 108 to the target position 109.

At the following time t=3, based on the detection result of the handshake amount by the gyroscope sensor, the computer 42 calculates the shift direction and the shift amount (that is, handshake correction component vector 132) of the correcting lens 55 for handshake correction. Based on the handshake correction component vector 132, target position 111 of the correcting lens 55 is determined.

After that, the correcting lens 55 is driven by the actuator 46 to shift from the present position 110 toward the target position 111 and, on the way, collides with the mechanical end. Therefore, the correcting lens can shift only to position 112 at the mechanical end as illustrated at time t=4. In this case, a part of the captured image 121 deforms and this deformation cannot be corrected by the EIS.

Figure 9:
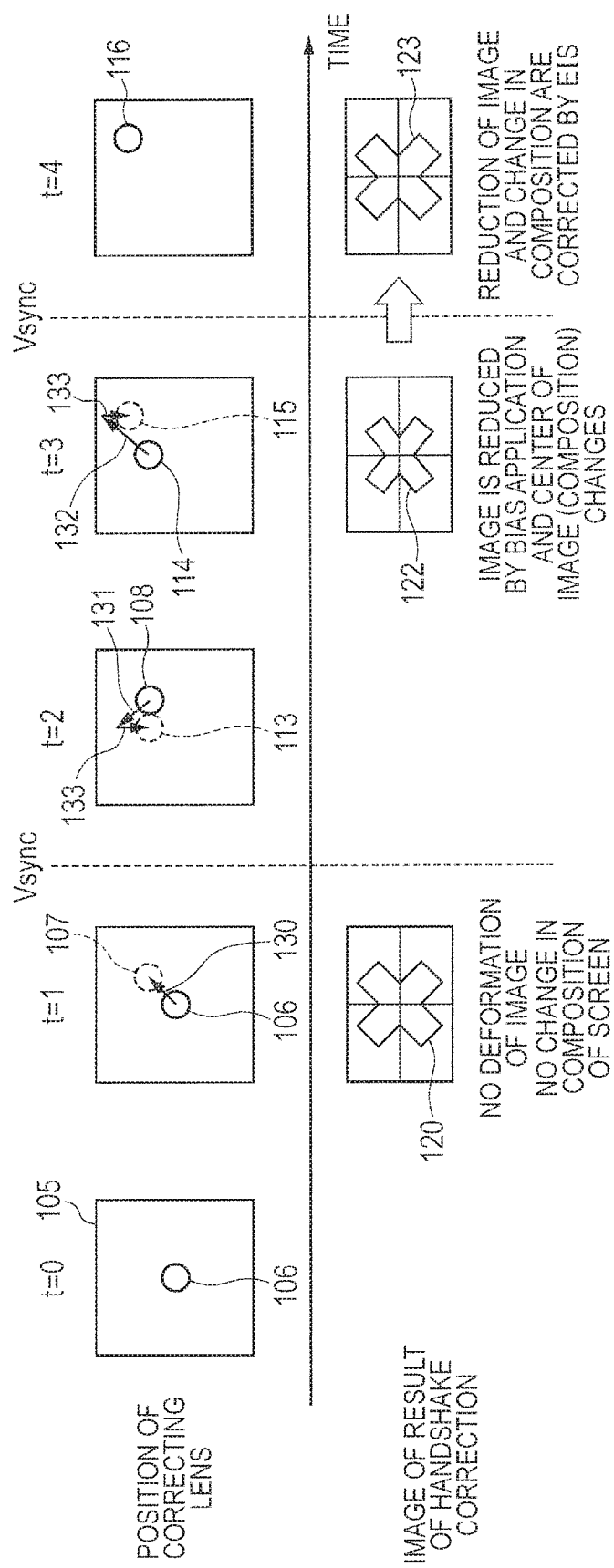
FIG. 9 is a diagram schematically illustrating changes in the position of the correcting lens and an image at the time of correcting handshake in the embodiment.

FIG. 9 is a diagram schematically illustrating changes in the position of the correcting lens and an image at the time of handshake correction in the embodiment. FIG. 9 illustrates the position of the correcting lens 55 in the movable range 105 and images output as results of the handshake correction. Time lapses in order of time t=0, t=1, t=2, t=3, and t=4. Each of the period between the time t=1 and the time t=2 and the period between the time t=3 and the time t=4 corresponds to a frame blanking period, and the imaging element 50 outputs the vertical sync signal Vsync at this timing.

Since the operations of the OIS module 40 at time t=0 and time t=1 are the same as those in the case of FIG. 8, the description will not be repeated.

At the frame blanking time between the time t=1 and the time t=2, the bias component generator 45 determines that the possibility that the correcting lens 55 deviates from the movable range 105 is high, and starts shifting the correcting lens 55 (that is, shifting in the direction of a bias component vector 133) at constant speed in the downward direction in the diagram.

At the time t=2, based on the detection result of the handshake amount by the gyroscope sensor, the computer 42 calculates the shift direction and the shift amount (that is, the handshake correction component vector 131) for handshake correction. By combining the handshake correction component vector 131 and the bias component vector 133, target position 113 of the correcting lens 55 for the present invention 108 is determined. After that, the correcting lens 55 is driven by the actuator 46 and moves from the present position 108 to the target position 113.

At time t=3, based on a detection result of the handshake amount by the gyroscope sensor, the computer 42 calculates the shift direction and the shift amount (that is, the handshake correction component vector 132) of the correcting lens 55 for handshake correction. By combining the handshake correction component vector 132 and the bias component vector 133, target position 115 of the correcting lens 55 for the present invention 114 is determined. The bias component vector 133 is the same as that in the case of time t=2 and expresses shifting at constant speed in a predetermined direction.

After that, the correcting lens 55 is driven by the actuator 46 and shifts from the present position 108 to the target position 113. As a result, the influence of the handshake is eliminated by the shifting of the correcting lens 55 to the handshake correction component vector 131, 132 direction. However, by the shifting to the direction of the bias component vector 133 of the correcting lens 55, the captured image 122 contracts in the vertical direction and the center position (that is, composition) of an image 122 in the screen changes.

At frame blanking time between time t=3 and the following time t4, the bias component generator 45 resets the bias component vector 133 to zero.

At time t=4, contraction of an image and a change in the composition caused by shifting of the correcting lens 55 in the direction of the bias component vector 133 are corrected by the EIS. As a result, there is no deformation in an image 123 after the EIS correction, and there is no change in the composition of the screen. Position 116 of the correcting lens 55 is a position closer to the mechanical center apart from the mechanical end.

As described above, in the first embodiment, in the case of shifting the correcting lens 55 to the direction of the mechanical center (that is, to the direction that the correction room becomes larger) for position adjustment of the correcting lens 55, the shooting composition changes accordingly. Although the change in the shooting composition is not absorbed by the OIS, it is absorbed by the EIS. However, there is a case that the correctable range exists also in the EIS and the lens deviates from the correctable range, or there is a case that the shooting composition is changed as an intention of an image capturing person such as panning or tilting. In this case, the EIS performs control on precondition that the shooting composition is changed.

In the case of changing the shooting composition in the EIS, there is a case of performing a control of slowly changing the composition so as to reduce a sense of discomfort of a viewer, which is called a pan tilt control. In the case of performing the pan tilt control in a system in which the OIS and the EIS are combined, since a handshake correction by the OIS is performed first, there is a case that a timing of detecting a change in the imaging composition by an EIS module delays.

In contrast, in the case of the embodiment, the fact that the OIS does not absorb a change in the composition by position adjustment of the correcting lens 55 is not a problem. Rather, the timing of detecting a change in the shooting composition by the EIS module becomes faster, to that the pan tilt control can be performed more smoothly.

Timing Chart of Handshake Correcting Process

Figure 10:
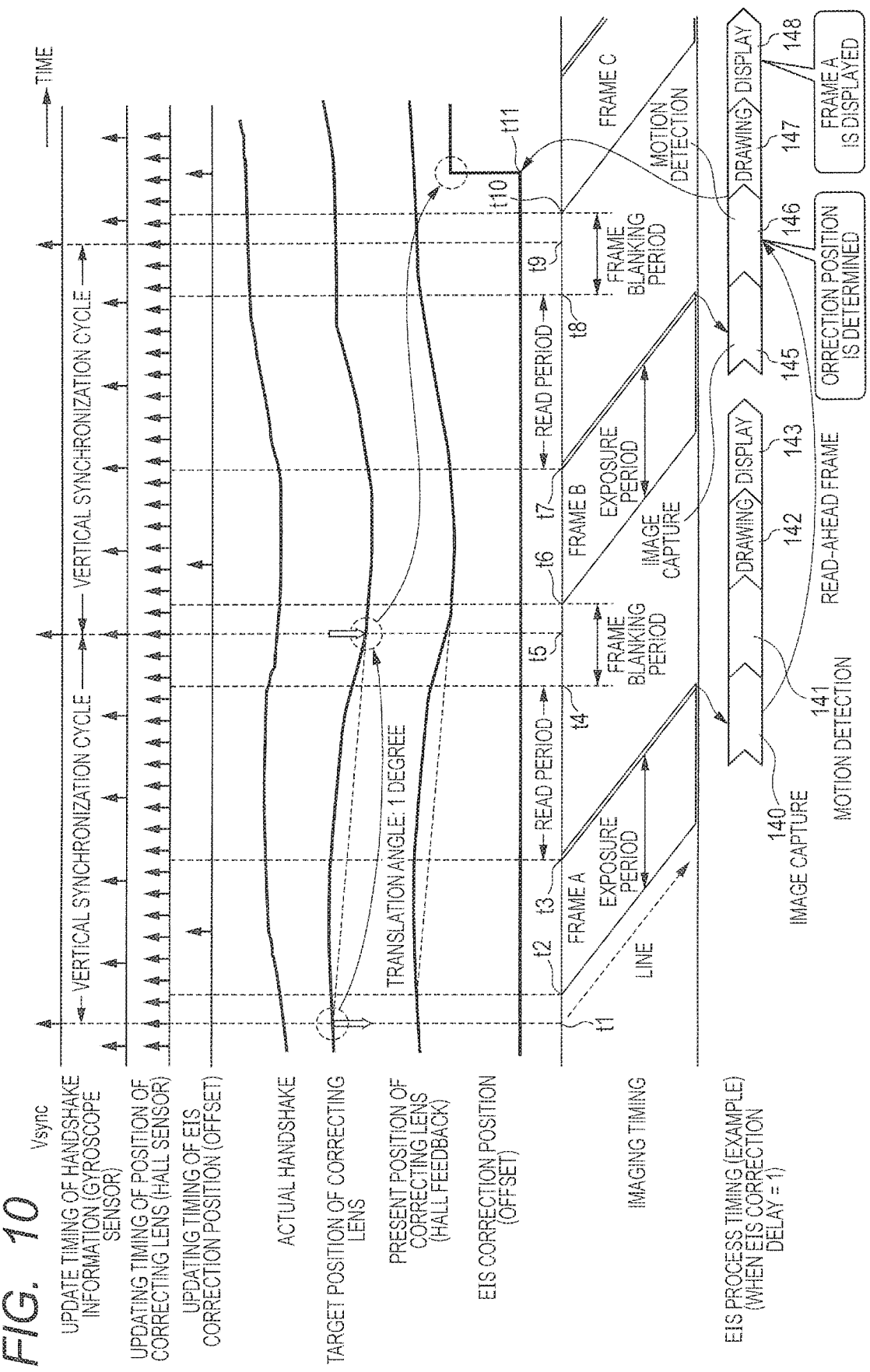
FIG. 10 is a schematic timing chart of handshake correcting process.

FIG. 10 is a schematic timing chart of handshake correcting process. In FIG. 10, in order from the top, an output timing of the vertical sync signal Vsync, an updating timing of handshake information output from the gyro sensor, an updating timing of position information of the correcting lens 55 output from the Hall sensor, and an updating timing of image correction by the EIS are illustrated. In FIG. 10, further, an actual handshake amount, a target position of the correcting lens, the position of the correcting lens, an offset amount of the screen by the EIS, an imaging timing, and a procedure of the EIS are illustrated in order.

Referring to FIGS. 1 and 10, the vertical sync signal Vsync is output from the imaging element 50 at times t1, t5, and t9 within a frame blanking period. In the same cycle as the output of the vertical sync signal Vsync, a plane position (offset) is updated by the EIS. It is assumed that, for example, the number of frames per second is set to 30 fps. In this case, the frequency of the vertical sync cycle, that is, the update frequency of correction by the EIS is, for example, 30 Hz (the vertical sync cycle is 33.3 msec). The exposure period in the case of 30 fps is, for example, about 25 sec, and the frame blanking period is about 8 msec. The above-described exposure period is time since exposure of the first line is started until exposure of the last line is finished.

The update frequency of an output signal of the shake sensor 41 such as a gyroscope sensor is, for example, 1 KHz (update cycle is 1 msec). The update frequency of an output signal of the position sensor 47 such as a Hall sensor is, for example, 20 KHz (update cycle is 50 μsec). In the specification, the update cycle of an output of a Hall sensor will be called a Hall feedback cycle.

In frame A, exposure of a first line is performed from time t2 to time t3. The exposure is sequentially performed on lines and, after the exposure, data of the lines is read. At time t4, data reading (that is, image capture 140) of all of the lines is finished. A period from time t4 to time t6 is a frame blanking period.

When the image capture 140 of the frame A is finished at the time t4, motion 141 of the subject is detected by comparing with image data of a read-ahead frame, and drawing 142 and display 143 of an EIS-corrected image are subsequently executed. An image displayed here is an image of a frame just before the frame A.

In the following frame B, exposure of the first line is performed from time t6 to time t7 and, after the exposure, data of the line is read. The lines are sequentially exposed and, at time t8, data reading (that is, image capture 145) of all of the lines is finished. A period from time t8 to time t10 is a frame blanking period.

When the image capture 145 of the frame B is finished at time t8, the motion 141 of the subject is detected by comparing with the image data of the frame A which was read ahead, and the drawing 142 and display 143 of the image of the EIS-corrected frame A are subsequently executed.

In the case of FIG. 10, between the time t1 during the frame blanking period and time t5 during the frame blanking period, shifting of the correcting lens 55 to a position near the mechanical center is executed so that the correcting lens 55 does not collide with the mechanical end. For the purpose of improvement of handshake correction performance, time required to move the correcting lens is desired as short as possible within the range the settling period does not become an issue. Therefore, the period of shifting the correcting lens is set to a period equal to or almost equal to the cycle of the vertical sync signal. To facilitate correction by the EIS by preventing the bias component from changing during an exposure period, generation and cancellation of a bias component for a handshake correction component are executed based on a signal expressing the start of a frame blanking period (for example, the vertical sync signal Vsync).

As a concrete example, it is assumed that the shift range of the correcting lens for the OIS corresponds to the shake angle of ±1.5 degrees and, when the shake angle of the OIS correction lens becomes equal to or larger than +1.0 degree or equal to or less than −1.0 degree, control of shifting the correcting lens from the mechanical end to the mechanical center is performed. In this case, the correcting lens is shifted only by an amount corresponding to the shake angle of one degree during the vertical sync cycle (or exposure period). Therefore, the shifting angle of each Hall feedback cycle becomes (entire shifting angle: 1.0 degree)×(Hall feedback cycle)/(vertical sync cycle). In other words, every Hall feedback cycle in which an output signal of the Hall sensor is updated, the correcting lens moves only by the shake angle corresponding to the bias component.

Hereinafter, on assumption of the specification of the optical system, supplement is made regarding the number of pixels or LSBs (Least Significant Bits, used as a quantization unit) to which the shift angle of each Hall feedback cycle corresponds.

For example, it is assumed that the angle of view of the optical system is 75 degrees. The angle of view corresponds to focal length of 28 mm in terms of the size of 35 mm of a film (imaging element). It is assumed that the horizontal angle of view in an image plane is 65 degrees, and the vertical angle of view is 48 degrees.

For example, the number of pixels of an imaging element (CMOS image sensor) is set to 13 M pixels (4200×3100 pixels). One degree of the vertical/horizontal angle of view corresponds to an amount of about 65 pixels. It is also assumed that reading of the Hall sensor is performed by an ADC (Analog-to-Digital Converter) of 12 bits, and one degree of the vertical/horizontal angle of view corresponds to about 1000 LSB.

In such a case, the number of pixels which move every Hall feedback cycle for position adjustment of the correcting lens 55 is (entire shifting angle: 1.0 degree)×65 [pixels]× (Hall feedback cycle)/(vertical sync cycle). When the shift amount of each Hall feedback cycle is expressed by the LSB, it is expressed as (entire shifting angle: 1.0 degree)× 1000 [LSB]×(Hall feedback cycle)/(vertical sync cycle). In place of the exposure period, the cycle of the vertical sync signal Vsync may be used.

Flowchart of Handshake Control

Figure 11:
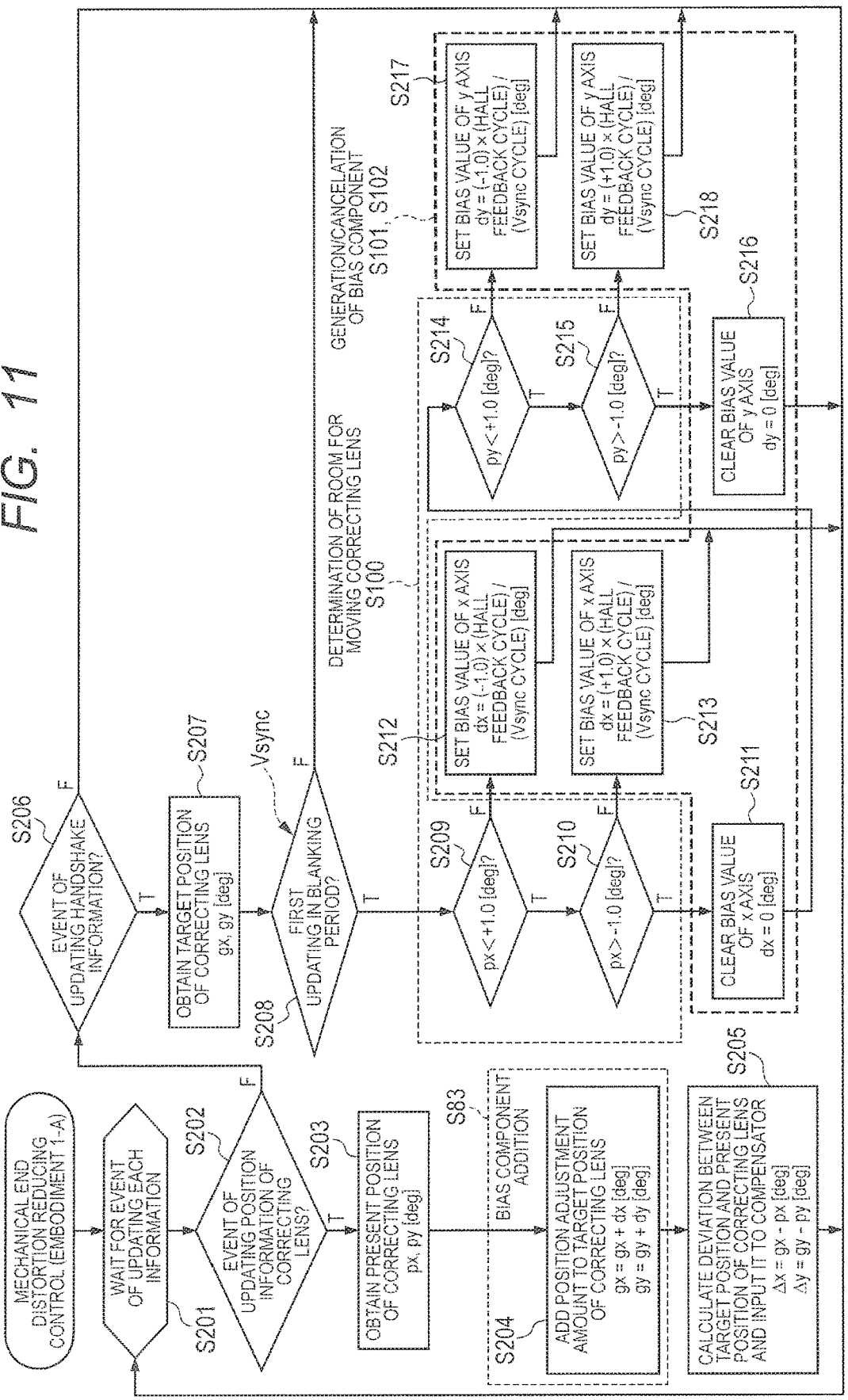
FIG. 11 is a flowchart illustrating the handshake correcting procedure in the case of the first embodiment.
Figure 12:
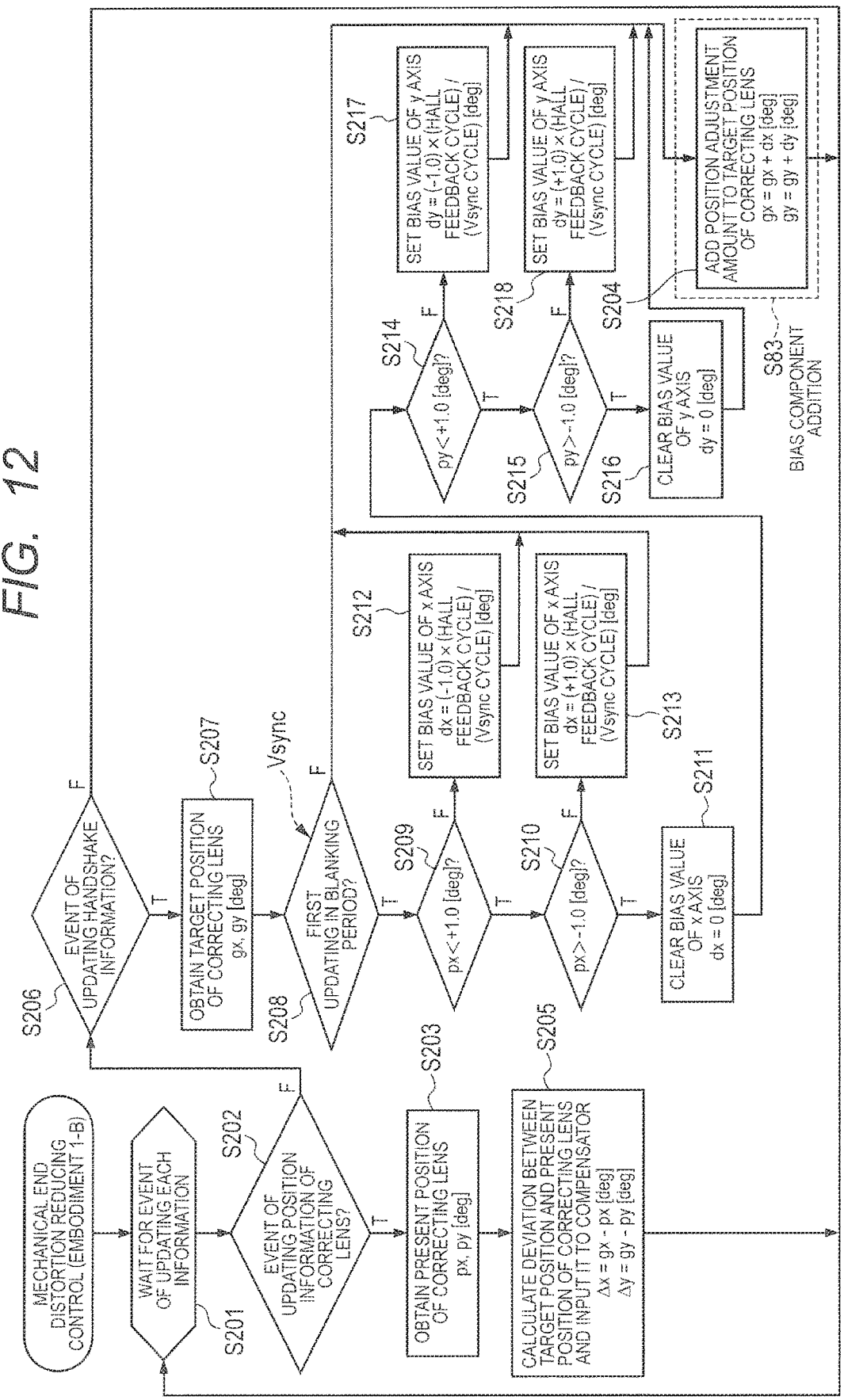
FIG. 12 is a flowchart illustrating a modification of the handshake correcting procedure of FIG. 11.

Hereinafter, as summary of the above description, the handshake control procedure by the OIS and the EIS of the embodiment will be described with reference to mainly the flowcharts of FIGS. 11 and 12. In FIGS. 11 and 12, in particular, the operation of the bias component generator 45 and the adder 43 (that is, control for reducing the mechanical end distortion) in FIG. 1 is illustrated specifically.

FIG. 11 is a flowchart illustrating the handshake correcting procedure in the case of the first embodiment. In the control procedure illustrated in FIG. 11, at the timing when the output signal of the position sensor 47 such as a Hall sensor is updated (that is, every Hall feedback cycle), bias values dx and dy for adjusting the position of the correcting lens 55 are added to target positions gx, gy of the correcting lens 55.

Referring to FIGS. 1 and 11, in step S201, the OIS module 40 waits for update of output information from the position sensor 47 such as a Hall sensor or update of output information from the shake sensor 41 such as a gyroscope sensor.

It is assumed that an output from the position sensor 47, that is, position information of the correcting lens 55 is updated ("True" in step S202). In this case, in the following step S203, the OIS module 40 obtains the present position px, py [deg] of the correcting lens. When the z-axis direction is set as the optical axis direction, px expresses the pitch angle as rotation angle around the x axis, and py expresses the yaw angle as rotation angle around the y axis. In the center of the movable range of the correcting lens 55, px=0 and py=0.

In the following step S204, the adder 43 of the OIS module 40 generates a new target position gx, gy [deg] by adding the position adjustment amount dx, dy [deg] of the correcting lens 55 to the target position gx, gy [deg] of the correcting lens 55 at present. That is, the addition of the bias component described in the step S83 in FIG. 6 is executed. In the case where the position adjustment control for returning the position of the correcting lens 55 from a position near the mechanical end to a position near the mechanical center is not performed, the position adjustment amount dx, dy [deg] of the correcting lens 55 is 0.

In the following step S205, the adder 43 of the OIS module 40 computes a deviation Δx, Δy [deg] by subtracting the present position px, py [deg] of the correcting lens 55 from the target position gx, gy [deg] of the correcting lens at present, and supplies the obtained deviation to the compensator 44.

On the other hand, it is assumed that an output from the shake sensor 41 such as a gyroscope sensor, that is, handshake detection information is updated ("false" in step S202 and "true" in step S206). In this case, in the following step S207, the computer 207 obtains the target position gx, gy [deg] of the correcting lens 55 by computing the correction amount of the correcting lens 55 according to the handshake amount detected.

In the following step S208, the bias component generator 45 of the OIS module 40 determines whether it is first update of handshake information in the blanking period on the basis of whether the imaging timing signal 80 such as the vertical sync signal Vsync is received or not. In the case where it is not the first update of the handshake information in the blanking period ("false" in step S208), the OIS module 40 returns to the state where an event of information update is waited (step S201).

On the other hand, in the case of first updating of handshake information in the blanking period ("True" in step S208), the OIS module 40 performs the determination of whether there is room for shifting of the correction lens 55 described in the step S100 in FIG. 6 and, after that, generates or clears the bias component as described in the steps S101 and S102 in FIG. 6.

Concretely, when the pitch angle px as the rotation angle around the x axis is equal to or larger than 1.0 [deg] ("False" in step S209), in the following step S212, the bias component generator 45 sets the bias value dx [deg] of the pitch angle around the x axis. The bias value is obtained as dx=(−1.0)×(Hall feedback cycle)/(vertical sync cycle). That is, a negative bias component dx is set so as to reset the pitch angle px to around 0 degree. The vertical sync cycle is a cycle of the vertical sync signal Vsync and, in the specification, is also called a Vsync cycle. In place of the vertical sync period, an exposure period may be used.

Similarly, when the pitch angle px as the rotation angle around the x axis is equal to or less than −1.0 [deg] ("False" in step S210), in the following step S213, the bias component generator 45 sets the bias value dx [deg] of the pitch angle around the x axis. The bias value is obtained as dx=(+1.0)×(Hall feedback cycle)/(vertical sync cycle). That is, a positive bias component dx is set so as to reset the pitch angle px to around 0 degree.

Similarly, when the yaw angle py as the rotation angle around the y axis is equal to or larger than 1.0 [deg] ("False" in step S214), in the following step S217, the bias component generator 45 sets the bias value dy [deg] of the yaw angle around the y axis. The bias value is obtained as dy=(−1.0)×(Hall feedback cycle)/(vertical sync cycle). That is, a negative bias component dy is set so as to reset the yaw angle dy to around 0 degree.

Similarly, when the yaw angle py as the rotation angle around they axis is equal to or less than −1.0 [deg] ("False" in step S215), in the following step S218, the bias component generator 45 sets the bias value dy [deg] of the yaw angle around the y axis. The bias value is obtained as dy=(+1.0)×(Hall feedback cycle)/(vertical sync cycle). That is, a positive bias component dy is set so as to reset the yaw angle dy to around 0 degree.

On the other hand, when the pitch angle px as the rotation angle around the x axis is less than 1.0 [deg] ("True" in step S209) and larger than −1.0 [deg] ("True" in step S210), the bias component generator 45 clears the bias value dx related to the x axis to 0 (step S211).

Similarly, when the yaw angle py as the rotation angle around the y axis is less than 1.0 [deg] ("True" in step S214) and larger than −1.0 [deg] ("True" in step S215), the bias component generator 45 clears the bias value dy related to the y axis to 0 (step S216).

By the above, the generation or clearance of the bias component described in the steps S101 and S102 in FIG. 6 is finished. After that, the handshake correcting process returns to step S201.

FIG. 12 is a flowchart illustrating a modification of the handshake correcting procedure of FIG. 11. In the control procedure illustrated in FIG. 12, at a timing the output signal of the shake sensor 41 such as a gyroscope sensor is updated (that is, every detection cycle of the gyroscope sensor), the bias values dx and dy for adjustment of the position of the correcting lens 55 are added to the target position gx, gy of the correcting lens 55.

Concretely, in the control procedure of FIG. 12, the step S204 in FIG. 11 is executed at the end of a series of processes executed when a handshake information updating event occurs ("True" in step S206), that is, after the steps S212, S213, S216, S217, and S218. Since the other points in FIG. 12 are the same as those in the case of FIG. 11, the same reference numerals are designated to the same or corresponding parts and the description will not be repeated.

Since the detection cycle of the gyroscope sensor is longer than the Hall feedback cycle (1 to 2 KHz vs 20 to 50 KHz), by computing the bias value every detection cycle of the gyroscope sensor, the frequency of computation can be reduced. It is assumed that as a processor computing an output signal of the gyroscope sensor, a processor adapted to computation of larger number of significant figures is used. Therefore, although it is not an essential difference, it is desirable to use the control procedure of FIG. 12 more than the control procedure of FIG. 11.

Effects of First Embodiment

As described above, according to the embodiment, while performing handshake correction by the OIS during an exposure period, the position of the correcting lens is adjusted simultaneously. An image distortion accompanying the position adjustment of the correcting lens is eliminated by the EIS. In such a manner, while avoiding collision of the correcting lens with the mechanical end, the handshake correction by the OIS can be executed continuously.

In the conventional technique, the correcting lens is adjusted only in the frame blanking period. Consequently, the shifting speed of the correcting lens becomes large and, as a result, in the OIS for a smartphone, as an example, a settling period of about 5 msec becomes necessary. It contradicts a request to assure an exposure period as long as possible to reduce noise of an imaging element. An actual settling period depends on conditions such as lens mass, actuator characteristic, and compensator design. The figure of about 5 msec is just an example in the case of the OIS for a smartphone. According to the embodiment, the settling period becomes unnecessary.

A bias component of a predetermined value is added to a handshake correction component for the position adjustment of the correcting lens. Desirably, the start and end of the addition of the bias component lie in the blanking period. In this case, the entire frame image, not a part of the frame image is uniformly deformed due to the position adjustment of the correcting lens, so that correction of the image distortion by the EIS becomes easy, and an image of a high picture quality can be obtained. To detect the blanking period, the imaging timing signal 80 such as a vertical sync signal is supplied from the imaging element 50 to the OIS module 40.

It is also desirable that the bias component is added only in the period of imaging one frame. The reason is that the position adjustment of the correcting lens is finished as quickly as possible under the condition of facilitating the correction of the image distortion by the EIS.

Preferably, the bias component added to the handshake correction component has a predetermined value. The predetermined bias value is determined, when the center position of the correcting lens becomes in a range of threshold distance from the mechanical end, so as to return the center position of the correcting lens to the mechanical center in the following exposure period. Concretely, a bias value is set to a value obtained by multiplying the shift amount of the correcting lens with a Hall feedback cycle and dividing the resultant by a vertical sync cycle (or exposure period).

Modifications of First Embodiment

Hereinafter, some modifications of the first embodiment will be described.

(1) The imaging element 50 of the embodiment is not limited to the rolling shutter type. In some cases, it can be applied to a mechanical shutter type. An example is a method of generating a slit by falling shutter curtains called a front curtain and a rear curtain with a time difference and performing exposure while the slit passes (a king of a focal plane shutter). In this case as well, the technique of the embodiment can be applied. In the case of performing imaging at shutter speed so that the slit is sufficiently narrow, a distortion similar to a rolling shutter distortion occurs. In addition, when exposure partially progresses with time difference on an imaging screen as a characteristic of the imaging element, there is the possibility that the technique of the embodiment can be applied.

(2) The period in which the bias component generator 45 outputs a bias value does not always have to be synchronized with the vertical sync signal and does not have to match the vertical sync cycle. It is sufficient that an image deformation is corrected by the EIS. As long as a predetermined bias value can be output during an exposure period, the start and end timings are not limited.

(3) Whether the center position of the correcting lens is near the mechanical end or not can be determined whether it lies in a threshold range from the mechanical end or not. The threshold in this case can be adjusted and can be changed according to the movable range of the correcting lens or the use case of the camera.

(4) The handshake correction technique can be also applied to the case of capturing a still image when the EIS capable of correcting a rolling shutter distortion is used.

Generally, in the still image capturing, exposure is performed only in one frame. Consequently, means of positioning the center position in an optimum position (that is, the mechanical center in which the correctable range can be assured most widely) at the exposure start position (that is, before the shutter is opened) in both the OIS and EIS can be used. In the case of displaying a preview by using an LCD mainly in a smartphone or digital camera (the case where there is no optical finder), in many cases, the handshake correction is requested also in a preview state. The reason is that even a user who is not accustomed to use a camera can easily shoot the subject. In the case of progress from a preview state to immediately a still image capturing, the position of the correcting lens cannot be reset to the mechanical center immediately before still image capturing. The reason is that imaging is performed in a composition different from the composition of imaging determined by the user in a preview.

In the case where the correcting lens is positioned near the mechanical end when the handshake correction s performed in a preview state before start of exposure for capturing a still image, it is preferable to continuously perform the OIS correction by performing the position adjustment of the correcting lens and the OIS correction at the same time.

Second Embodiment

Electronic devices 30B and 30C of a second embodiment have a characteristic with respect to the point that information of a bias value output from the bias component generator 45 to the EIS module side. Hereinafter, the second embodiment will be concretely described with reference to the drawings.

First Configuration Example

Figure 13:
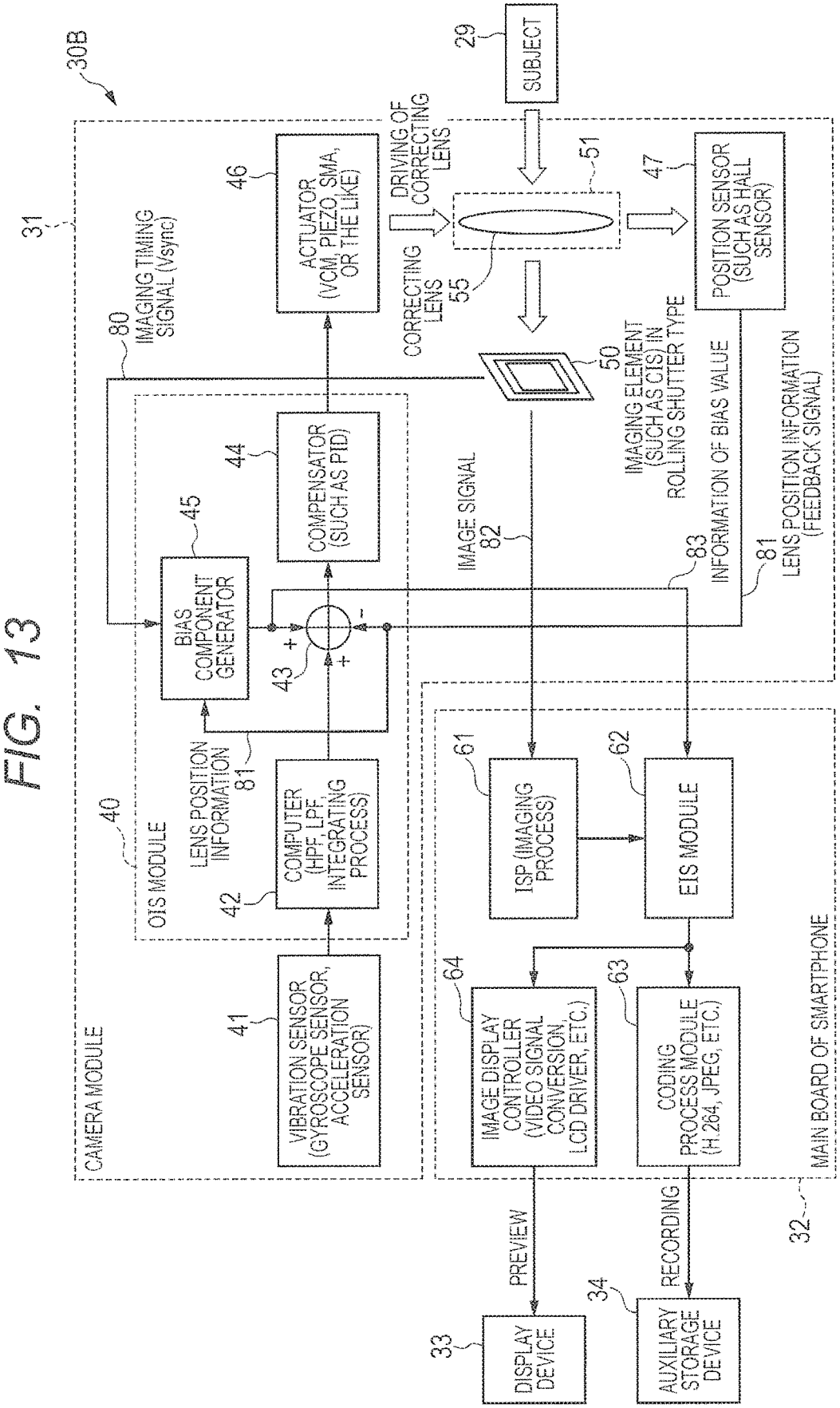
FIG. 13 is a block diagram illustrating an example of the configuration of an electronic device of a second embodiment.

FIG. 13 is a block diagram illustrating an example of the configuration of an electronic device of a second embodiment. In FIG. 13, as an example of the electronic device, a smartphone with a camera module is assumed.

The electronic device 30B illustrated in FIG. 13 is different from the electronic device 30A in FIG. 1 with respect to the point that bias value information 83 (that is, information regarding position adjustment of the correcting lens 55) is transmitted from the bias component generator 45 in the OIS module 40 to the EIS module 62. Since the other points of the electronic device 30B in FIG. 13 are similar to those of the electronic device 30A in FIG. 1, the same reference numerals are designated to the same or corresponding parts, and their description will not be repeated.

Figure 14:
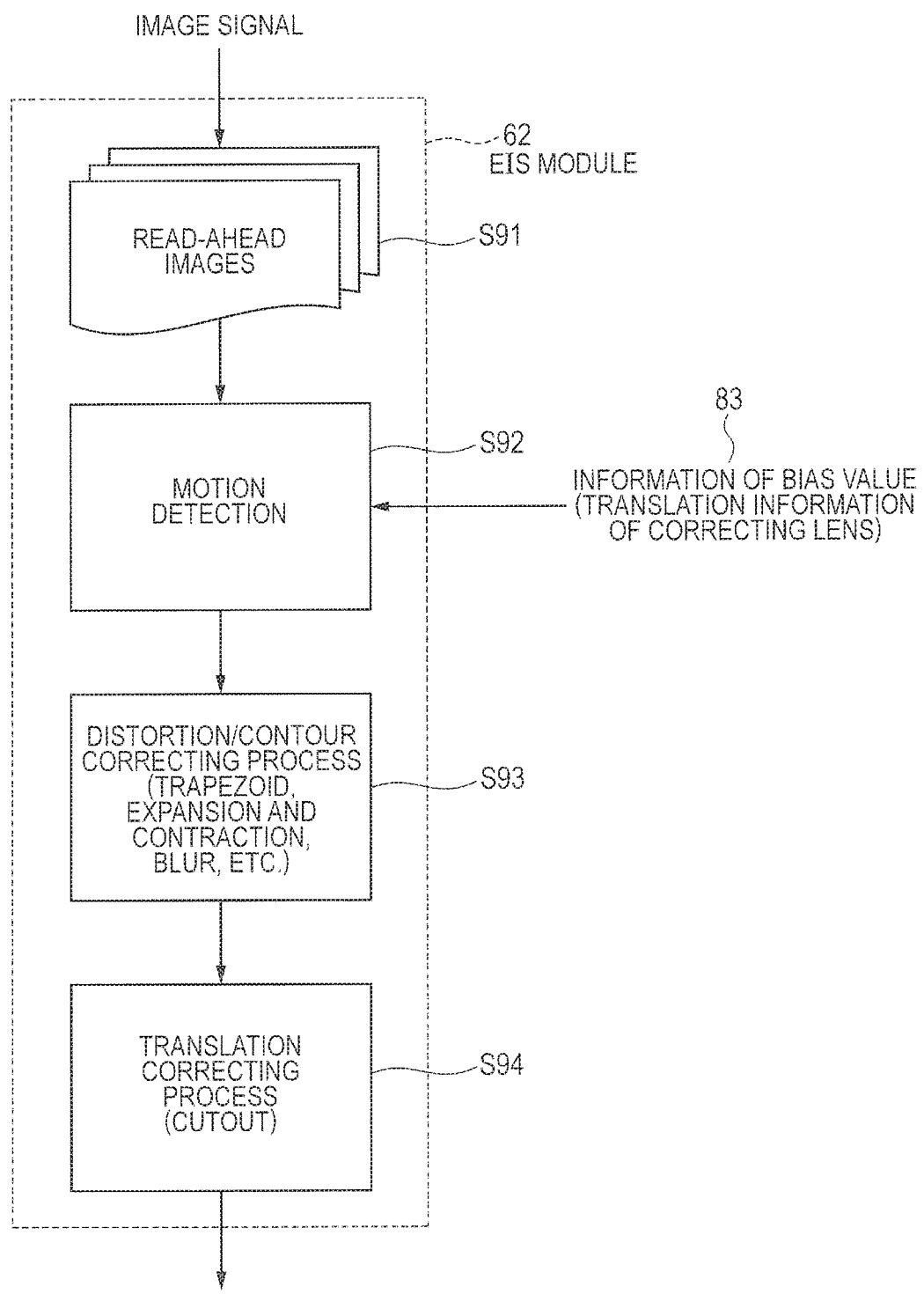
FIG. 14 is a flowchart illustrating the procedure of handshake correcting process by an EIS module in FIG. 13.

FIG. 14 is a flowchart illustrating the procedure of handshake correcting process by the EIS module in FIG. 13. The flowchart of FIG. 14 corresponds to FIG. 3 of the first embodiment, and the same reference numerals are designated to the same or corresponding steps.

Referring to FIGS. 13 and 14, the information 83 of the bias value output from the bias component generator 45 is used at the time of detecting the shift direction and the shift amount of the correcting lens 55 on the basis of a plurality of pieces of image data in step S92. By the above, a distortion in an image caused by the position adjustment of the correcting lens 55 can be reliably corrected by the EIS module 62.

As described in the first embodiment, for example, in the case of a CMOS image sensor of 13M pixels (4200×3100), one degree of the angle of view in each of the vertical and horizontal directions corresponds to about 65 pixels. Therefore, a distortion of an image accompanying a shake corresponding to one degree of the angle of view is not large. Depending on the magnitude of the bias value output from the bias component generator 454, there is the possibility that the EIS module 62 erroneously determines the necessity of an electronic rolling shutter distortion. In the electronic device 30B of the second embodiment, by supplying the information 83 of the bias value to the EIS module 62, an error of the determination can be eliminated.

Second Configuration Example

FIG. 15 is a block diagram illustrating another configuration example of an electronic device of a second embodiment. Also in FIG. 15, a smartphone with a camera module is assumed as an example of the electronic device.

The electronic device 30C illustrated in FIG. 15 is different from the electronic device 30B of FIG. 13 with respect to the point that the image processor 90 such as a GPU (Graphic Processing Unit) or a graphic accelerator is used in place of the EIS module 62.

The image processor 90 illustrated in FIG. 15 executes a deforming process 91 corresponding to the step S93 in FIGS. 3 and 13 and a cutting process 92 corresponding to step S94 by software process based on a program.

Concretely, in the deforming process 91, the image processor 90 corrects deformation of an image which occurs due to an ERS deformation or the like on the basis of the information 83 of the bias value for the position adjustment of the correcting lens 55. Further, the image processor 90 performs correction of shifting an effective image region on the basis of the shift amount of the correcting lens 55 (in other words, correction of cutting a part of the shootable pixel region) to correct a change in the composition generated by the position adjustment of the correcting lens 55 in the cutting process 92. As the shift amount of the correcting lens 55, in the case of the first embodiment, a predetermined value may be used or the shift amount can be calculated by multiplying the bias value with application time.

Effects

As described above, according to the second embodiment, in the case of performing the position adjustment of the correcting lens 55 during the exposure period to continuously execute the OIS correction, information regarding the shift amount (for example, the bias value) of the correcting lens 55 for position adjustment is transmitted to the EIS module 62. Consequently, a distortion of an image caused by the position adjustment of the correcting lens 55 can be reliably eliminated by the EIS.

When the information related to the shift amount of the correcting lens 55 for position adjustment is given, by using the image processor 90 such as a GPU having more generality in place of the EIS module 62, an image distortion accompanying the position adjustment of the correcting lens 55 can be eliminated. Therefore, the technique of the present disclosure can be applied also to a camera module having only the OIS. Since the image processor 90 such as a GPU is a component essential to an image processing device such as a camera, additional cost can be suppressed.

Third Embodiment

In a third embodiment, an example of changing a method of determining a bias value at the time of adjusting the position of a correcting lens will be described. For example, a bias value determining method can be changed according to the use case.

FIG. 16 is a diagram illustrating a method of determining a bias value for adjusting the position of a correcting lens in a table form. Hereinafter, description will be given with reference to the block diagram of FIG. 1 and the table of FIG. 16.

1. Mechanical Center Returning Method

In a mechanical center returning method, regardless of the position of the correcting lens after end of the exposure period, the bias value is determined so that the correcting lens moves to the mechanical center in the following vertical sync period. Even when the target of shifting the correcting lens is set to the mechanical center, the correcting lens moves also to correct a handshake which occurs during an exposure period, so that it does not always return to the mechanical center. Therefore, also in the following exposure period, the position adjustment of the correcting lens becomes unnecessary.

By the method, the correctable range becomes the maximum at the start points of all of exposure periods. Consequently, it is adapted to a use in which a relatively large handshake is assumed, for example, a use for shooting while walking, sports, and the like. However, the bias value of each exposure period is not constant, so that the computing process becomes necessary. In addition, since position adjustment of the correcting lens and distortion correction by the EIS module accompanying the adjustment are performed for all of frames, there is a demerit that the picture quality is lower as compared with that in other methods.

2. Bias Value Fixing Method (Shifting of about ⅙ of Correctable Range)

In the case where the correcting lens is positioned near the mechanical end after the end of an exposure period, the correcting lens is moved toward the mechanical center only by about ⅙ of a diametral correction angle in the following vertical synch period (0.5 degree when the correctable range is ±1.5 degrees).

According to the method, since the bias value is fixed, it is expected that the precision of restoring an image deformation accompanying the position adjustment of the correcting lens is increased. Since the position adjustment of the correcting lens is not performed when a handshake is small, high picture quality can be expected. Since a bias value is small even in the case of performing the position adjustment of the correcting lens, relatively high picture quality can be expected. Since a bias value is a constant, calculation is unnecessary, so that the process amount of the processor is small. In consideration of those merits, the method is suitable to, for example, the use of portrait.

However, since a bias value in the case of performing the position adjustment of the correcting lens is suppressed to be relatively small, when a handshake amount is large, the possibility that the correcting lens deviates from the correctable range is high.

3. Bias Value Fixing Method (Shifting of about ⅓ of Correctable Range)

Although this method is similar to the above-described method 2, the correction angle in the case of performing the position adjustment of the correcting lens is larger than that in the method 2. Concretely, in the case where the correcting lens is positioned near the mechanical end after the end of an exposure period, the correcting lens is moved toward the mechanical center only by about ⅓ of a diametral correction angle in the following vertical synch period (1.0 degree when the correctable range is ±1.5 degrees). The shifting distance of the correcting lens was described in the first embodiment.

Comparison of the Above-Described Methods

Figure 17:
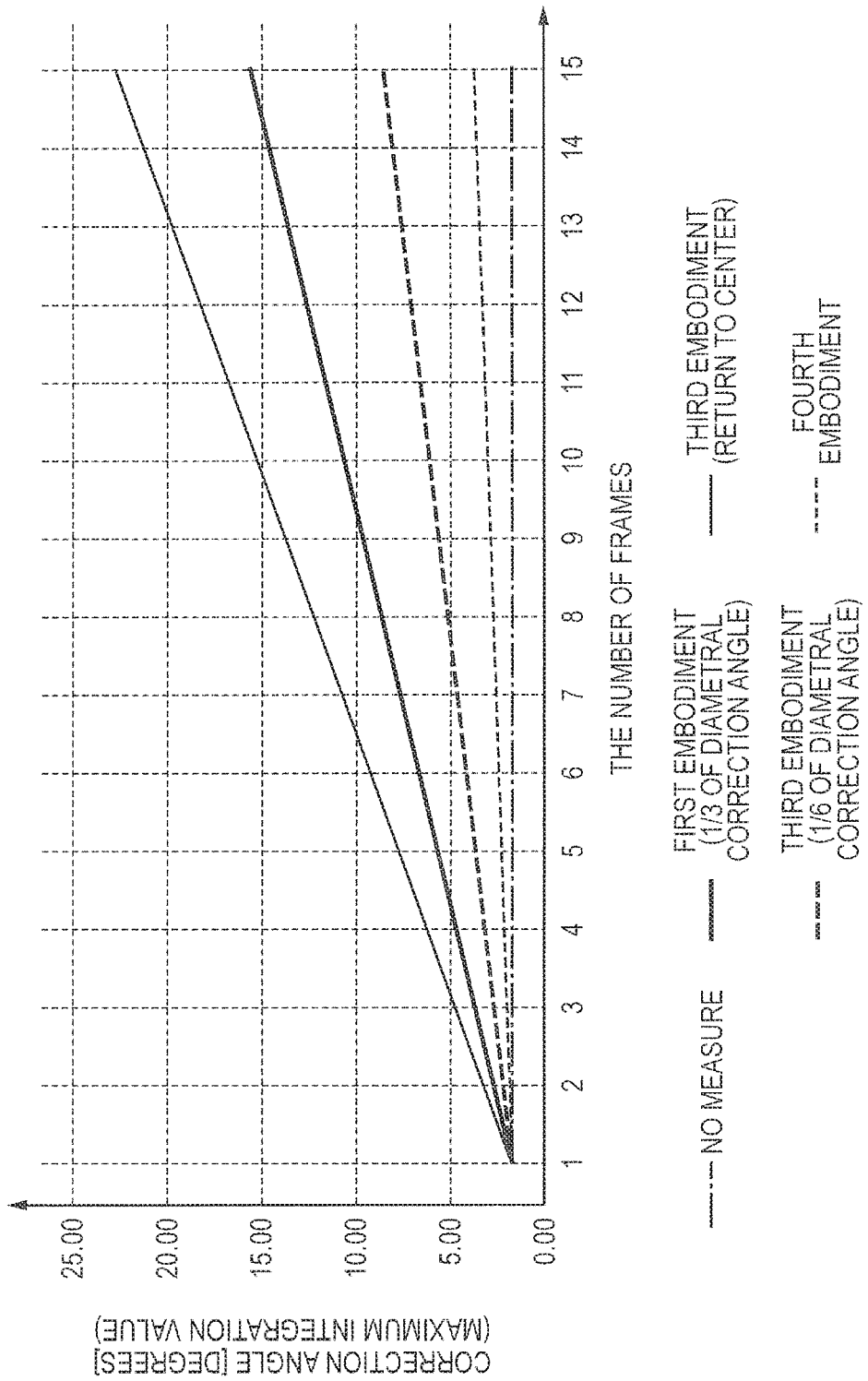
FIG. 17 is a diagram illustrating a maximum integration value of the shifting angle of the correcting lens.

FIG. 17 is a diagram illustrating a maximum integration value of the shifting angle of the correcting lens. In FIG. 17, it is assumed that the movable range of the correcting lens is set to ±1.5 degrees, and the correcting lens is positioned in the mechanical center in an initial state.

In the case where the position adjustment of the correcting lens is not performed (alternate long and short dash line in FIG. 17: no measure), the limit of the shifting angle of the correcting angle becomes 1.5 degrees regardless of the number of frames.

In the case of the mechanical center returning method of the third embodiment (narrow solid line in FIG. 17), correction of maximum 1.5 degrees can be performed for each frame. Therefore, the maximum integration value of the shifting angle of the correcting lens in ten frames is about 15 degrees.

As described in the first embodiment, in the case of shifting the correcting lens toward the mechanical center only by about ⅓ of the diametral correction angle (1.0 degree when the correctable range is ±1.5 degrees) (thick solid line in FIG. 17), even when the position adjustment of the correcting lens is performed every frame, the correction angle of each frame is 1.0 degree at maximum. Therefore, the maximum integration value of the shifting angle of the correcting lens in ten frames is about 10 degrees.

As described in the third embodiment, in the case of shifting the correcting lens toward the mechanical center only by about ⅙ of the diametral correction angle (0.5 degree when the correctable range is ±1.5 degrees) (thick broken line in FIG. 17), even when the position adjustment of the correcting lens is performed every frame, the correction angle of each frame is 0.5 degree at maximum. Therefore, the maximum integration value of the shifting angle of the correcting lens in ten frames is about five degrees.

In FIG. 17, the case of a bias value determining method of a fourth embodiment is illustrated by a thin broken line. It will be described later.

Effects

The third embodiment can be combined with the first and second embodiments and produces effects similar to those of the first and second embodiments. Further, according to the third embodiment, according to a use case, the handshake correction performance and the picture quality can be selected. The handshake correction performance and the picture quality have a tradeoff relation.

Fourth Embodiment

In case of a smartphone or the like, the OIS module is often assembled in the camera module 31. Consequently, in the case where the configuration of the camera module 31 other than the OIS module 40 is not changed, the OIS module 40 has to execute the position adjustment of the correcting lens 55 without using the imaging timing signal 80 such as the vertical sync signal Vsync.

In a fourth embodiment, therefore, the case of performing the position adjustment of the correcting lens 55 asynchronously with the imaging timing without needing transmission of the imaging timing signal 80 (for example, the vertical sync signal Vsync) from the imaging element 50 to the bias component generator 45 of the OIS module 40 will be described.

General Configuration of Electronic Device

Figure 18:
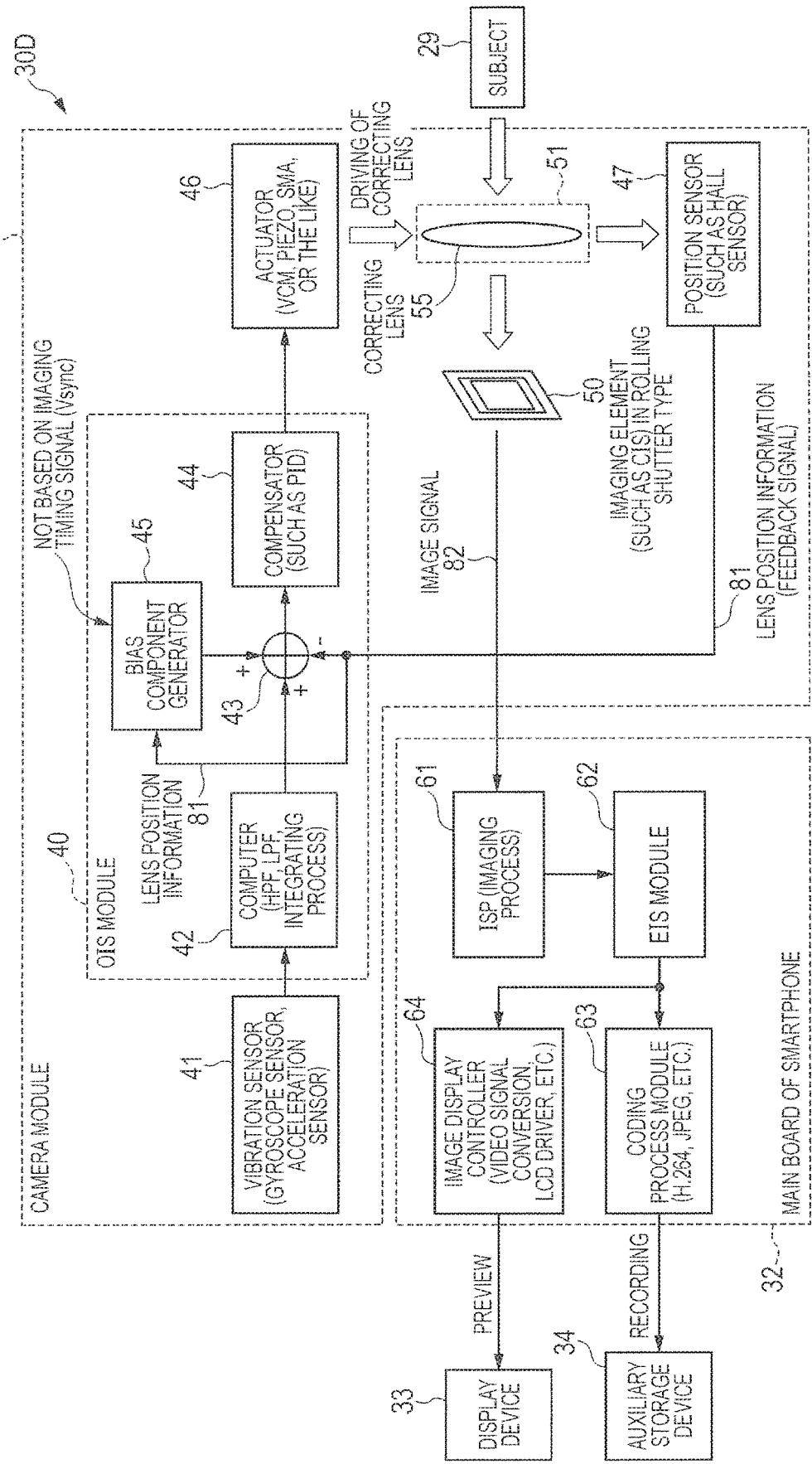
FIG. 18 is a block diagram illustrating the configuration of an electronic device 30D as an example of a fourth embodiment.

FIG. 18 is a block diagram illustrating the configuration of an electronic device 30D as an example of the fourth embodiment. The block diagram of FIG. 18 corresponds to FIG. 1 of the first embodiment. Concretely, the electronic device 30D in FIG. 18 is different from the electronic device 30A of FIG. 1 with respect to the point that the imaging timing signal 80 is not transmitted from the imaging element 50 to the bias component generator 45 of the OIS module 40. Therefore, the operation of the bias component generator 45 of the OIS module 40 is different from that in the case of the first embodiment. Since the other points of FIG. 18 are the same as those in the case of FIG. 1, the same reference numerals are designated to the same or corresponding parts, and the description will not be repeated.

Figure 19:
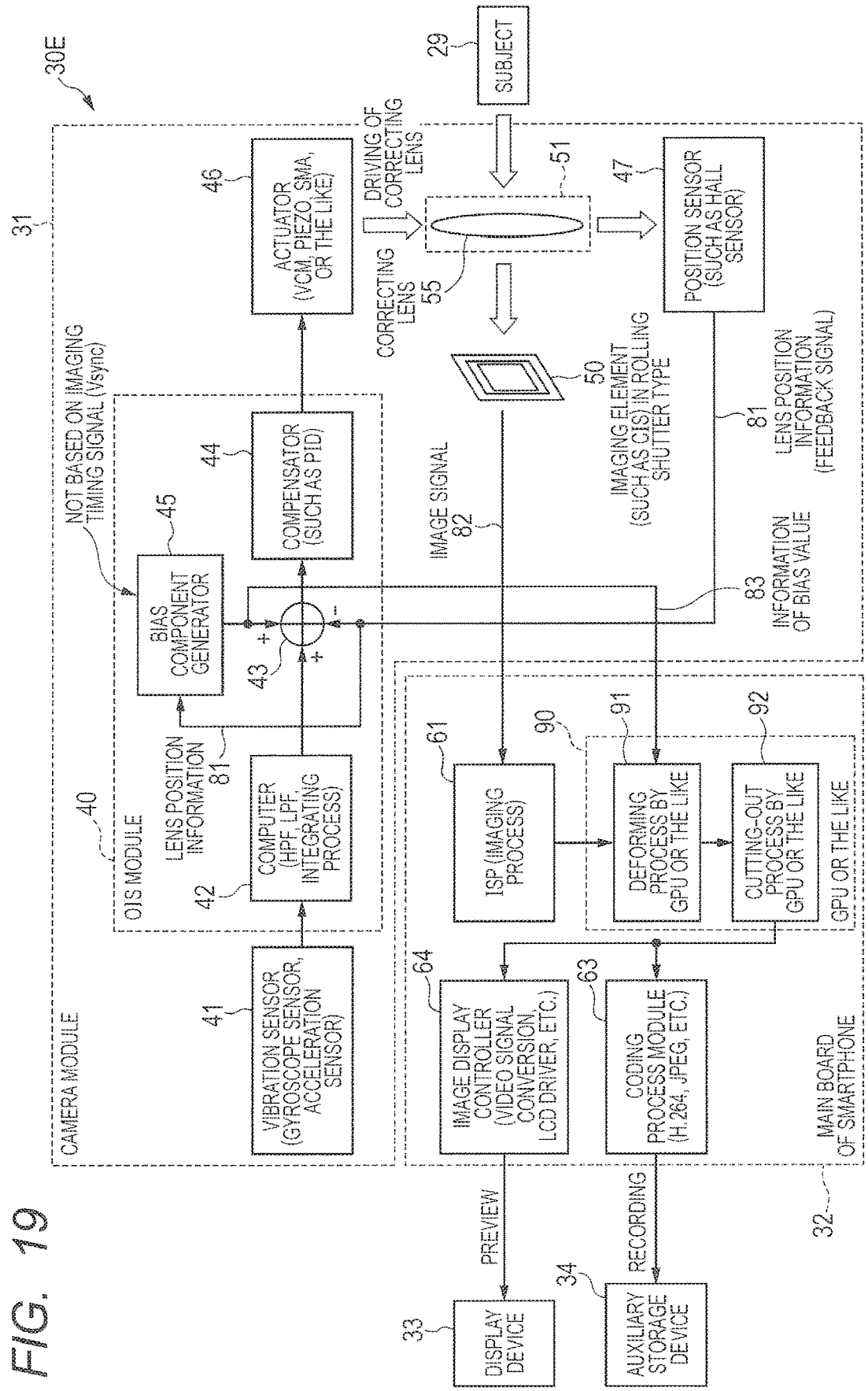
FIG. 19 is a block diagram illustrating the configuration of an electronic device 30E as another example of the fourth embodiment.

FIG. 19 is a block diagram illustrating the configuration of an electronic device 30E as another example of the fourth embodiment. Concretely, the electronic device 30E in FIG. 19 is different from the electronic device 30C of FIG. 15 with respect to the point that the imaging timing signal 80 is not transmitted from the imaging element 50 to the bias component generator 45 of the OIS module 40. Therefore, the operation of the bias component generator 45 of the OIS module 40 is different from that in the case of FIG. 15 of the third embodiment. Since the other points of FIG. 19 are the same as those in the case of FIG. 15, the same reference numerals are designated to the same or corresponding parts, and the description will not be repeated.

Outline of Operation of OIS Module

Referring to FIGS. 18 and 19, the main cause which largely deteriorates the picture quality when the correcting lens collides with the mechanical end is that a handshake component of high frequency (for example, 30 Hz or higher) is not solved by the OIS and is passed to the EIS (or a GPU or the like), and it is difficult to correct the handshake component of high frequency by the EIS (such as a GPU). Further, a new shake component is generated due to bounce or the like of the correcting lens by the mechanical end, and it makes an image deformed. Therefore, collision of the correcting lens with the mechanical end has to be avoided as much as possible.

In the first embodiment, the reason that the bias component generator 45 starts outputting the bias component within a blanking period based on the imaging timing signal 80 and stops outputting the bias component in the following blanking period is, by preventing the bias value from changing during the exposure period, to reliably perform image correction by the EIS. However, if the magnitude of the bias value is regulated and the application frequency of the bias value is not high, even the bias value is applied without synchronously with the imaging timing signal 80, picture quality of a certain degree can be assured. Alternatively, position adjustment conditions of the correcting lens can be determined according to the necessary degree of picture quality and the handshake characteristics (for example, the magnitude of shake, a frequency component, and the like).

The position adjustment conditions of the correcting lens depend also on the specifications of the CMOS image sensor and the optical system. Hereinafter, it will be concretely described with numerical examples.

It is assumed that the angle of view of the optical system is, for example, 75 degrees. The angle of view corresponds to focal length 28 mm in terms of the size 35 mm of a film (imaging element). It is assumed that the horizontal angle of view in an image plane is 65 degrees, and the vertical angle of view is 48 degrees.

For example, the number of pixels of an imaging element (CMOS image sensor) is set to 13M pixels (4200×3100 pixels). One degree of the vertical/horizontal angle of view corresponds to an amount of about 65 pixels. It is also assumed that reading of the Hall sensor is performed by an ADC (Analog-to-Digital Converter) of 12 bits, and one degree of the vertical/horizontal angle of view corresponds to about 1000 LSB.

The number of frames per second is, for example, 30 fps. Then, the vertical sync cycle is 33.3 msec. The exposure period is set to 25 msec.

As a picture quality demanded, it is assumed that a distortion in the horizontal and vertical directions is allowed to maximum 10 pixels (0.32%) in one frame. The value relates to shifting time and the picture quality at the time of position adjustment of the correcting lens and is selected or adjusted according to the use of the camera. In the case where one degree in the horizontal and vertical directions corresponds to 65 pixels, a bias value which causes an allowed distortion is one degree×10/65=0.153[deg], 1000× 10/65=153[LSB]. Time required to move the correcting lens by one degree is about 33.3×65/10=216 [msec].

The minimum period of continuing shifting of the correcting lens by using the bias value which is set as described above is set as a bias application period. The bias application period can be arbitrarily set on the basis of the adjustment required time but is set to 10 to 15 frames (300 to 500 msec) in consideration of a shake amount such as a camera holding state until the shutter is pressed.

The frequency of image deterioration caused by a change in the bias value during the exposure period is not so high. Concretely, on assumption that a change point of the bias value occurs twice at arbitrary time points within 10 frames from the ratio (75%) between the vertical sync cycle and the exposure period, the probability that a frame in which an image deteriorates appears in the 10 frames is 15%. Therefore, in frames (about 85%) except for frames whose bias application start time point and bias application end time point are included in the exposure period, a distortion of an image accompanying position adjustment of the correcting lens (for example, a rolling shutter distortion) can be corrected by the EIS.

Details of Operation of OIS Module

Figure 20:
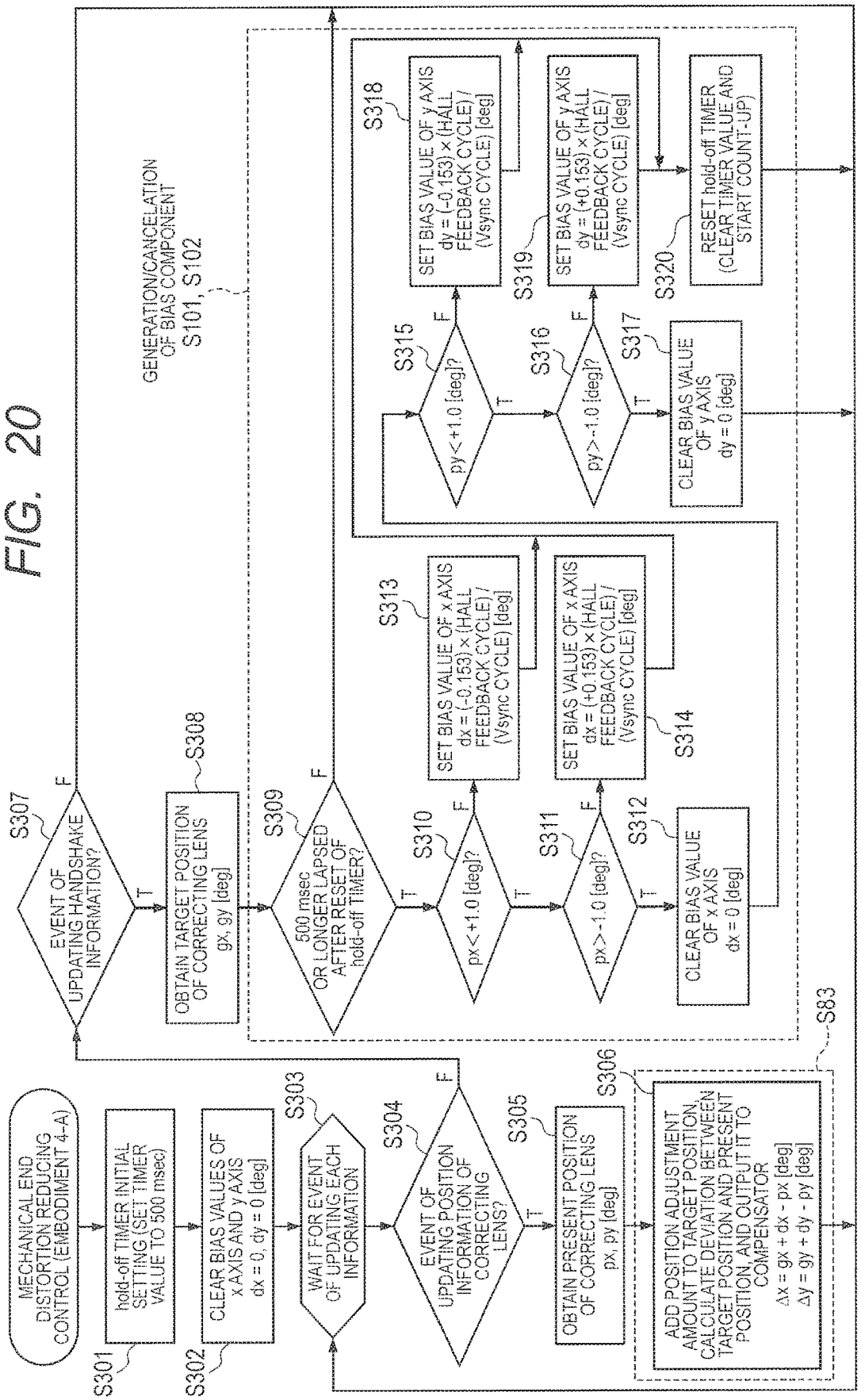
FIG. 20 is a flowchart illustrating a handshake correcting procedure in the case of FIG. 18.

Hereinafter, as summary of the above description, the handshake control procedure by the OIS and the EIS of the embodiment will be described with reference to the block diagram of FIG. 18 and the flowchart of FIG. 20. In FIG. 20, the operation of the bias component generator 45 and the adder 43 (that is, control for reducing the mechanical end distortion) in FIG. 18 is illustrated specifically.

FIG. 20 is a flowchart illustrating the handshake correcting procedure in the case of FIG. 18. Referring to FIG. 20, the OIS module 40 is provided with a not-illustrated hold-off timer.

In step S301, the bias component generator 45 makes initial setting of the hold-off timer. For example, the timer value is set to 500 msec. In this case, when 500 msec elapses after reset of the timer and the correcting lens is positioned near the mechanical end, the bias component generator 45 sets the bias value.

In the following step S302, the bias component generator 45 clears the bias values related to the x axis and the y axis to 0 [deg].

In step S303, the OIS module 40 waits for update of output information from the position sensor 47 such as a Hall sensor or update of output information from the shake sensor 41 such as a gyroscope sensor.

It is assumed that an output from the position sensor 47, that is, position information of the correcting lens 55 is updated ("True" in step S304). In this case, in the following step S305, the OIS module 40 obtains the present position px, py [deg] of the correcting lens. When the z-axis direction is set as the optical axis direction, px expresses the pitch angle as rotation angle around the x axis, and py expresses the yaw angle as rotation angle around the y axis. In the center of the movable range of the correcting lens 55, px=0 and py=0.

In the following step S306, the adder 43 of the OIS module 40 computes deviations Δx, Δy [deg] by adding the position adjustment amount dx, dy [deg] of the correcting lens 55 to the target position gx, gy [deg] of the correcting lens 55 at present and, further, subtracting the present position px, py [deg] of the correcting lens 55. The adder 43 supplies the obtained deviation to the compensator 44. By the above, the addition of the bias component described in the step S83 in FIG. 6 is executed.

In the step S306, when the position adjustment control for returning the position of the correcting lens 55 from a position near the mechanical end to a position near the mechanical center is not performed, the position adjustment amount dx, dy [deg] is zero.

On the other hand, it is assumed that an output from the shake sensor 41 such as a gyroscope sensor, that is, handshake detection information is updated ("False" in step S304 and "True" in step S307). In this case, in the following step S308, the computer 42 obtains the target position gx, gy [deg] of the correcting lens 55 by computing the correction amount of the correcting lens 55 according to the handshake amount detected.

In the following step S309, whether 500 msec or longer has lapsed after resetting the hold-off timer is checked. When 500 msec has not lapsed ("False" in step S309), the control returns to the state of waiting for input of an information update event (S303) without executing the following steps S310 and S320.

On the other hand, when 500 msec or longer has not lapsed after resetting the hold-off timer ("True" in step S309), the OIS module 40 determines whether there is room to move the correcting lens 55 described in the step S100 in FIG. 6 and, after that, generates or clears the bias component as described in the step S101 or S102 in FIG. 6.

Concretely, when the pitch angle px as the rotation angle around the x axis is equal to or larger than 1.0 [deg] ("False" in step S209), in the following step S212, the bias component generator 45 sets the bias value dx [deg] of the pitch angle around the x axis. The bias value is obtained as dx=(−1.0)×(Hall feedback cycle)/(vertical sync cycle). That is, a negative bias component dx is set so as to reset the pitch angle px to around 0 degree. The vertical sync cycle is a cycle of the vertical sync signal Vsync and, in the specification, is also called a Vsync cycle. In place of the vertical sync period, an exposure period may be used.

Similarly, when the pitch angle px as the rotation angle around the x axis is equal to or larger than 1.0 [deg] ("False" in step S310), in the following step S313, the bias component generator 45 sets the bias value dx [deg] of the pitch angle around the x axis. The bias value is obtained as dx=(−0.153)×(Hall feedback cycle)/(vertical sync cycle). That is, a negative bias component dx is set so as to reset the pitch angle px to around 0 degree. An exposure period may be used in place of the vertical sync cycle.

Similarly, when the pitch angle px as the rotation angle around the x axis is equal to or less than −1.0 [deg] ("False" in step S311), in the following step S314, the bias component generator 45 sets the bias value dx [deg] of the pitch angle around the x axis. The bias value is obtained as dx=(+0.153)×(Hall feedback cycle)/(vertical sync cycle). That is, a positive bias component dx is set so as to reset the pitch angle px to around 0 degree.

Similarly, when the yaw angle py as the rotation angle around the y axis is equal to or larger than 1.0 [deg] ("False" in step S315), in the following step S318, the bias component generator 45 sets the bias value dy [deg] of the yaw angle around the y axis. The bias value is obtained as dy=(−0.153)×(Hall feedback cycle)/(vertical sync cycle). That is, a negative bias component dy is set so as to reset the yaw angle dy to around 0 degree.

Similarly, when the yaw angle py as the rotation angle around the y axis is equal to or less than −1.0 [deg] ("False" in step S316), in the following step S319, the bias component generator 45 sets the bias value dy [deg] of the yaw angle around the y axis. The bias value is obtained as dy=(+0.153)×(Hall feedback cycle)/(vertical sync cycle). That is, a positive bias component dy is set so as to reset the yaw angle dy to around 0 degree.

When the setting of the bias value (any of the steps S313, S314, S318, and S319) is executed, the bias component generator 45 resets the hold-off timer. Specifically, the timer value of the hold-off timer is cleared, and new count-up starts.

On the other hand, when the pitch angle px as the rotation angle around the x axis is less than 1.0 [deg] ("True" in step S310) and larger than −1.0 [deg] ("True" in step S311), the bias component generator 45 clears the bias value dx related to the x axis to zero (step S312).

Similarly, when the yaw angle py as the rotation angle around the y axis is less than 1.0 [deg] ("True" in step S315) and larger than −1.0 [deg] ("True" in step S316), the bias component generator 45 clears the bias value dy related to the y axis to zero (step S317).

By the above, the generation or clearance of the bias component described in the steps S101 and S102 in FIG. 6 is finished. After that, the handshake correcting process returns to step S303.

As described with reference to FIG. 12, at a timing the output signal of the shake sensor 41 such as a gyroscope sensor is updated (that is, every detection cycle of the gyroscope sensor), the bias values dx and dy for adjustment of the position of the correcting lens 55 may be added to the target position gx, gy of the correcting lens 55.

Effects

The fourth embodiment can be combined with the first to third embodiments and produce effects similar to those of the first to third embodiments. Further, according to the fourth embodiment, by a minimum system change such as replacement of software of the OIS module 40, the position of the correcting lens can be optimized so that the OIS can be continued. In the case of the system configuration of FIG. 19, the EIS module 62 is unnecessary. Consequently, while suppressing cost, the OIS correction performance can be improved.

In the case of the fourth embodiment, however, there is a demerit that time required to move the correcting lens becomes long. In other words, as illustrated by the thin broken line in FIG. 17, the maximum integration value of the shift amount of the correcting lens becomes smaller than that in the case of other bias value determining methods. Consequently, the possibility that the correcting lens reaches the mechanical end and, as a result, the picture quality deteriorates is high.

Fifth Embodiment

In a fifth embodiment, examples of change of the hardware configuration will be described.

First Configuration Example

Figure 21:
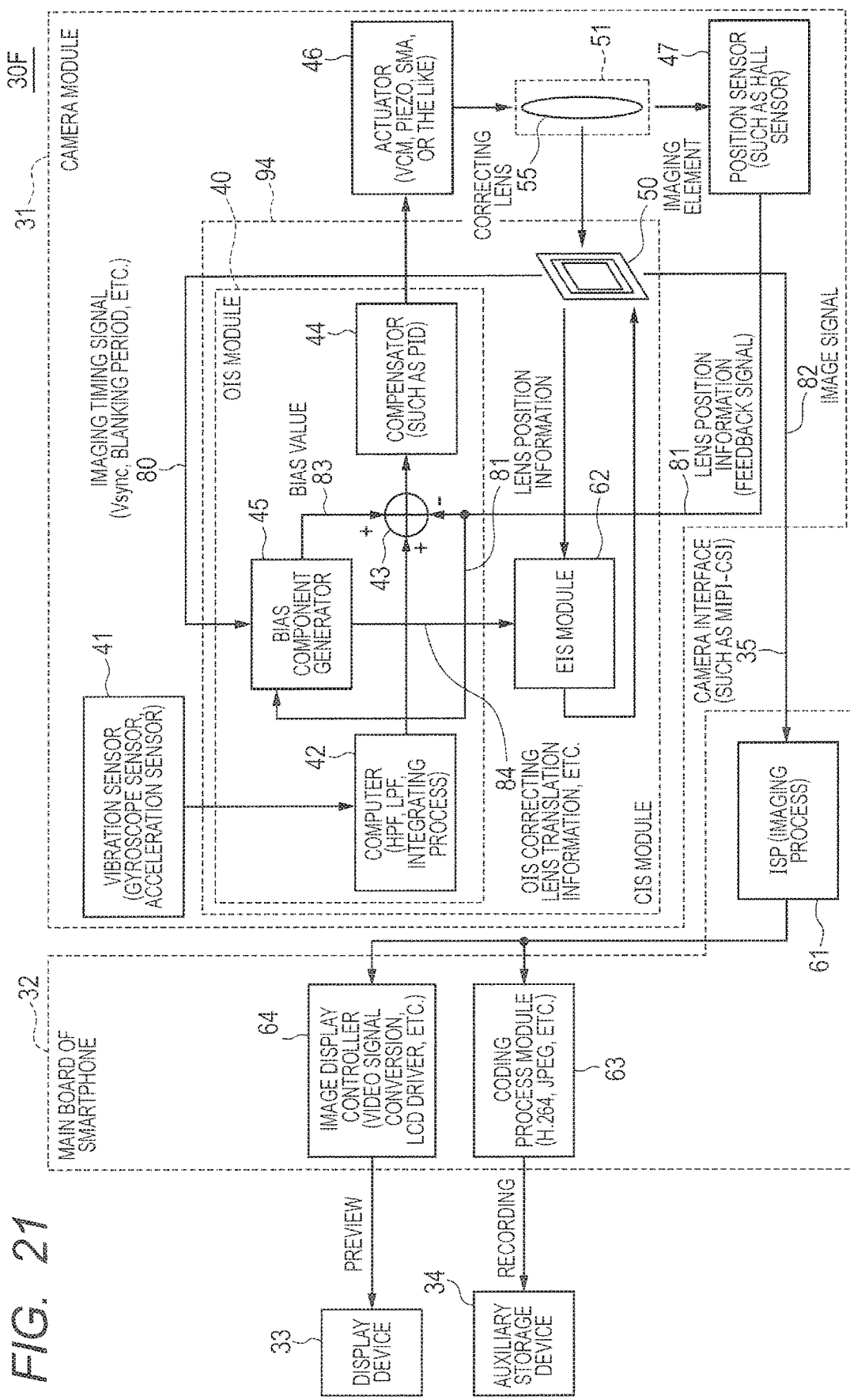
FIG. 21 is a block diagram illustrating the configuration of an electronic device 30F according to a first configuration example of a fifth embodiment.

FIG. 21 is a block diagram illustrating the configuration of an electronic device 30F according to a first configuration example of the fifth embodiment. FIG. 21 illustrates a configuration in the case where both the OIS module 40 and the EIS module 62 are provided in the camera module 31.

The electronic device 30F of FIG. 21 is different from the electronic device 30A of FIG. 1 with respect to the point that the EIS module 62 is provided in the camera module 31, not on the main board 32. In the case of FIG. 21, the OIS module 40, the EIS module 62, and the imaging element 50 are generally called a CIS module 94.

Referring to FIG. 21, a raw image signal (that is, raw data) output from the imaging element 50 is corrected by the EIS module 62. The image signal 82 after the correction is transmitted to the image signal processor 61 via the camera interface 35 such as a CSI-2 (Camera Serial Interface-2) of the MIPI (Mobile Industry Processor Interface Alliance). The signal subjected to the image process by the image signal processor 61 is transmitted to the encoding process module 63 and the image display controller 64. Since the other configuration of FIG. 21 is similar to that in the case of FIG. 1, the same reference numerals are designated to the same or corresponding parts and their description will not be repeated.

With the configuration of FIG. 21, the EIS and the OIS can be processed by the same processor. Conventionally, it is assumed that communication between the EIS and the OIS uses the I2C (Inter-Integrated Circuit which includes, for example, CCI (Camera Control Interface) of the CSI-2 of MIPI) or the like. The communication can be replaced by communication between tasks on the same processor. Therefore, overhead of the I2C communication between the camera module 31 and the main board 32 can be reduced.

Since the imaging timing signal 80 such as a vertical sync signal is also transmitted/received on the same processor, the system configuration can be simplified.

The handshake adjustment can be executed by the camera module alone regardless of a program for a smartphone. Conventionally, in the case of assembling the EIS module in the same chip in which an application processor is also assembled, there is a problem that the man-hours of development of software to optimize software to hardware increase. On the other hand, by providing the handshake correcting mechanism on the inside of the camera module, the man-hours of development of a smartphone system can be reduced, and there is a merit that expansion of a smartphone product becomes easy.

The hardware configuration of FIG. 1 or the hardware configuration of FIG. 21 can be selected according to the functions, performance, system cost, and the like necessary for the use. In the case of employing the hardware configuration of FIG. 21, the function of the EIS can be reduced according to the system resource (for example, memory capacity) of the CIS module 94.

Second Configuration Example

Figure 22:
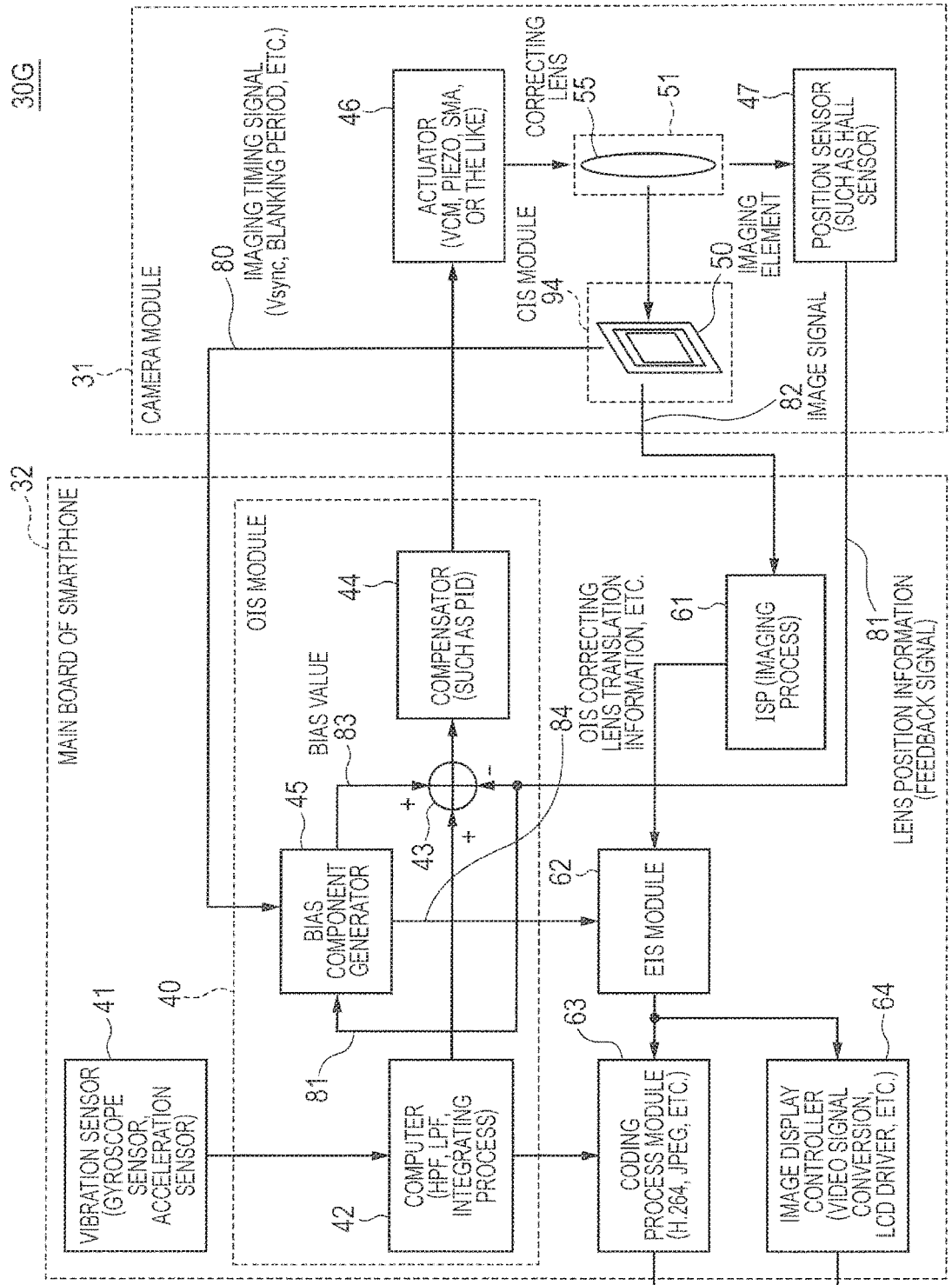
FIG. 22 is a block diagram illustrating the configuration of an electronic device 30G according to a second configuration example of the fifth embodiment.

FIG. 22 is a block diagram illustrating the configuration of an electronic device 30G according to a second configuration example of the fifth embodiment. FIG. 22 illustrates a configuration example that both of the OIS module 40 and the EIS module 62 are arranged in the main board 32.

The electronic device 30G of FIG. 22 is different from the electronic device 30A of FIG. 1 with respect to the point that the shake sensor 41 and the OIS module 40 are provided on the main board 32. Since the other points in FIG. 22 are similar to those of FIG. 1, the same reference numerals are designated to the same or corresponding parts and their description will not be repeated.

In the case of assembling the OIS module in the same chip as an application processor, it is considered to assemble it in a CPU or DSP for a sensor hub in which controls of various sensors (for example, a gyroscope sensor, a magnetic sensor, an acceleration sensor, and an atmospheric pressure sensor) are intensively provided.

As a background of providing the OIS process in the main board 32, in an SoC (System on Chip) for a smartphone of recent years, an example of multiple cores by tight coupling of asymmetric processors by a combination of a high-performance large-scale core and a small-electric-amount small-scale core can be mentioned. Therefore, a process in which high response is required but the computation amount is small like the OIS and sound reproduction can be also performed efficiently.

With the configuration of FIG. 22, the regulation on system resources (such as a memory, a CPU, and a GPU) by which the EIS can be used is relatively small as compared with the configuration of FIG. 21 in which the EIS is realized by the CIS module 94. Consequently, there is a merit that high-level EIS can be realized.

As an example of providing the OIS in the case of the first embodiment, it is assumed that the feedback cycle from a Hall sensor is 20 KHz to 50 KHz, and the cycle of updating output data of a gyroscope sensor is about 1 KHz to 10 KHz. It is also assumed that transmission of each of information from the OIS to the EIS is I2C or the like. Consequently, the overhead in data transfer (for example, communication delay and a process related to communication) tends to be large. On the other hand, since both the OIS module 40 and the EIS module 62 can be mounted on the same chip of the main board 32, improvement of the communication overhead between the OIS module 40 and the EIS module 62 is expected.

Since the OIS module 40 and the EIS module 62 can be realized on a common chip of the main board 32 together with the image signal processor 61, the encoding process module 63, and the image display controller 64, adjustment of the entire camera system can be performed intensively, and it is convenient for development and adjustment of a camera system.

Although the present invention achieved by the inventors herein has been concretely described above on the basis of the embodiments, obviously, the present invention is not limited to the embodiments but can be variously changed without departing from the gist.

What is claimed is:

1. A semiconductor device for controlling a camera module,
wherein the camera module executes optical image stabilization which eliminates influence of a handshake by shifting position of a movable object as at least a part of an optical system and an imaging element within a movable range, and wherein the semiconductor device comprises:
- a first computer configured to determine a shift amount of the movable object for the optical image stabilization on the basis of a detection value of a shake sensor;
- a second computer configured to determine a shift amount of the movable object to adjust the position of the movable object within the movable range; and
- a compensator configured to control an actuator for driving the movable object on the basis of a value obtained by adding the shift amount determined by the first computer and the shift amount determined by the second computer.

2. The semiconductor device according to claim 1, wherein the second computer determines the shift amount of the movable object so as to shift the movable object toward center of the movable range within an exposure period of the imaging element.

3. The semiconductor device according to claim 2, wherein the second computer changes the shift amount of the movable object so that the movable object starts shifting within a blanking period of the imaging element and the movable object finishes shifting within the following blanking period.

4. The semiconductor device according to claim 3, wherein the second computer changes the shift amount of the movable object on the basis of an imaging timing signal from the imaging element.

5. The semiconductor device according to claim 3, wherein when the movable object is positioned within a threshold range from an end of the movable range in a blanking period of the imaging element, the second computer sets the shift amount of the movable object so that the movable object shifts toward center of the movable range and wherein when the movable object is not positioned within the threshold range from the end of the movable range in the blanking period of the imaging element, the second computer sets the shift amount of the movable object to zero.

6. The semiconductor device according to claim 3, wherein the second computer sets a shift amount of the movable object in each exposure period so that the position of the movable object returns to center of the movable range during each exposure period.

7. The semiconductor device according to claim 1, wherein when the movable object is positioned within a threshold range from an end of the movable range even in an exposure period of the imaging element, the second computer changes the shift amount of the movable object so that the movable object starts shifting toward center of the movable range.

8. The semiconductor device according to claim 1, wherein a distortion of an image caused by adjustment of the position of the movable object can be eliminated by an electronic image stabilization module.

9. The semiconductor device according to claim 8, wherein the imaging element performs imaging by a rolling shutter method, and a distortion of the image is a rolling shutter distortion.

10. The semiconductor device according to claim 8, wherein the second computer outputs information related to a determined shift amount to the electronic image stabilization module.

11. The semiconductor device according to claim 1, wherein a distortion of an image caused by adjustment of the position of the movable object can be eliminated by an image processor.

12. The semiconductor device according to claim 11, wherein the second computer outputs information related to the determined shift amount to the image processor.

13. The semiconductor device according to claim 1, wherein the compensator controls the actuator by feedback control based on an output of a position sensor for detecting present position of the movable object.

14. The semiconductor device according to claim 13, wherein each time an output of the position sensor is updated, target position of the movable object for the feedback control is determined on the basis of the shift amount of the movable object determined by the first computer and the shift amount of the movable object determined by the second computer.

15. The semiconductor device according to claim 13, wherein each time an output of the shake sensor is updated, target position of the movable object for the feedback control is determined on the basis of the shift amount of the movable object determined by the first computer and the shift amount of the movable object determined by the second computer.

16. The semiconductor device according to claim 1, wherein a distortion of an image caused by adjustment of the position of the movable object can be eliminated by an image processor.

17. A semiconductor device for controlling a camera module configured to execute optical image stabilization, the semiconductor device comprising:
- a first computer configured to determine a shift amount of a movable object for the optical image stabilization based on a detection value of a shake sensor, the movable object being at least a part of an optical system and an imaging element;
- a second computer configured to determine a shift amount of the movable object to adjust the position of the movable object within a movable range of the movable object; and
- a compensator configured to control an actuator for driving the movable object based on an addition value of the shift amount determined by the first computer and of the shift amount determined by the second computer.

18. The semiconductor device according to claim 17, wherein the second computer determines the shift amount of the movable object so as to shift the movable object toward center of the movable range within an exposure period of the imaging element.

19. The semiconductor device according to claim 18, wherein the second computer changes the shift amount of the movable object so that the movable object starts shifting within a blanking period of the imaging element and the movable object finishes shifting within the following blanking period.

20. An electronic device comprising:
- an imaging element;
- an optical system for forming an optical image of a subject on the imaging element;
- a shake sensor for detecting a handshake;
- an actuator for shifting position of a movable object as at least a part of the optical system and the imaging element within a movable range to perform optical image stabilization;

a first computer determining a shift amount of the movable object for the optical image stabilization on the basis of a detection value of the shake sensor;
a second computer determining a shift amount of the movable object to adjust the position of the movable object within the movable range;
a compensator controlling the actuator on the basis of a value obtained by combining the shift amount determined by the first computer and the shift amount determined by the second computer; and
a third computer for eliminating a distortion of an image caused by adjusting the position of the movable object.

* * * * *